United States Patent
Lee et al.

(10) Patent No.: US 11,818,369 B2
(45) Date of Patent: Nov. 14, 2023

(54) IMAGE SENSOR MODULE, IMAGE PROCESSING SYSTEM, AND IMAGE COMPRESSION METHOD

(71) Applicant: SAMSUNG ELECTRONICS CO., LTD., Suwon-si (KR)

(72) Inventors: Wonseok Lee, Suwon-si (KR); Yunseok Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 93 days.

(21) Appl. No.: 17/374,168

(22) Filed: Jul. 13, 2021

(65) Prior Publication Data
US 2022/0021889 A1    Jan. 20, 2022

(30) Foreign Application Priority Data

Jul. 16, 2020 (KR) .......... 10-2020-0088451
Mar. 4, 2021 (KR) .......... 10-2021-0029046

(51) Int. Cl.
| | |
|---|---|
| H04N 19/182 | (2014.01) |
| H04N 19/176 | (2014.01) |
| H04N 19/65 | (2014.01) |
| H04N 19/167 | (2014.01) |

(52) U.S. Cl.
CPC ......... *H04N 19/182* (2014.11); *H04N 19/167* (2014.11); *H04N 19/176* (2014.11); *H04N 19/65* (2014.11)

(58) Field of Classification Search
CPC .... H04N 19/176; H04N 19/593; H04N 19/70; H04N 19/186; H04N 11/046; H04N 19/80
See application file for complete search history.

(56) References Cited

U.S. PATENT DOCUMENTS

| | | | |
|---|---|---|---|
| 8,244,049 B2 | 8/2012 | Lee et al. | |
| 8,462,853 B2 | 6/2013 | Jeon et al. | |
| 9,396,557 B2 | 7/2016 | Yang et al. | |
| 9,877,035 B2* | 1/2018 | Zou | H04N 19/197 |
| 2001/0046318 A1 | 11/2001 | Lee et al. | |
| 2004/0049497 A1* | 3/2004 | Curry | H04N 1/46 |
| 2004/0131266 A1* | 7/2004 | Kondo | H04N 19/56 375/E7.11 |
| 2005/0129121 A1* | 6/2005 | Sung | H04N 19/428 375/240.23 |
| 2005/0276489 A1* | 12/2005 | Ishikawa | H04N 1/644 382/232 |

(Continued)

FOREIGN PATENT DOCUMENTS

KR    10-1515440    4/2015

*Primary Examiner* — Daniel Chang
(74) *Attorney, Agent, or Firm* — F. Chau & Associates, LLC

(57) ABSTRACT

An image sensor module, an image processing device, and an image compression method receive pixel values of a target pixel group to be compressed in the image data and reference values of reference pixels to be used for compression of the target pixel group, generate a virtual reference map by applying an offset value to each of the reference values, compress the pixel values of the target pixel group based on the virtual reference map, and generate a bitstream based on a compression result and compression information based on the virtual reference map.

20 Claims, 22 Drawing Sheets

(56) References Cited

U.S. PATENT DOCUMENTS

| | | | |
|---|---|---|---|
| 2008/0018794 A1* | 1/2008 | Fung | H04N 19/156 348/612 |
| 2008/0131087 A1* | 6/2008 | Lee | H04N 19/436 375/E7.206 |
| 2008/0151101 A1* | 6/2008 | Tian | H04N 7/0115 348/448 |
| 2009/0161759 A1* | 6/2009 | Seo | H04N 19/107 375/E7.126 |
| 2010/0220792 A1* | 9/2010 | Kamito | H04N 19/176 375/E7.076 |
| 2010/0232507 A1* | 9/2010 | Cho | H04N 19/157 375/E7.123 |
| 2010/0265392 A1* | 10/2010 | Shao | H03M 7/3044 348/E7.003 |
| 2011/0216784 A1* | 9/2011 | Park | H04N 19/70 370/476 |
| 2012/0294544 A1* | 11/2012 | Lin | H04N 19/91 382/238 |
| 2013/0301720 A1* | 11/2013 | Lee | H04N 19/137 375/240.12 |
| 2013/0343662 A1* | 12/2013 | Ando | H04N 19/46 382/233 |
| 2014/0111564 A1* | 4/2014 | Jeon | G09G 5/026 345/99 |
| 2014/0270554 A1* | 9/2014 | Matsumura | H04N 19/61 382/233 |
| 2014/0270558 A1* | 9/2014 | Watanabe | H04N 19/174 382/239 |
| 2014/0376634 A1* | 12/2014 | Guo | H04N 19/82 375/240.16 |
| 2015/0117774 A1* | 4/2015 | Yang | G09G 3/2003 382/166 |
| 2015/0125086 A1* | 5/2015 | Jeong | H04N 19/186 382/239 |
| 2015/0341643 A1* | 11/2015 | Xu | H04N 19/136 375/240.02 |
| 2015/0374313 A1* | 12/2015 | Kogure | H04N 19/63 382/131 |
| 2016/0080748 A1* | 3/2016 | Sasai | H04N 19/46 375/240.12 |
| 2016/0150243 A1* | 5/2016 | Shima | H04N 19/176 375/240.12 |
| 2016/0165236 A1* | 6/2016 | Ikeda | H04N 19/186 375/240.13 |
| 2016/0260417 A1* | 9/2016 | Asai | G09G 5/397 |
| 2016/0295235 A1* | 10/2016 | Kobayashi | H04N 19/593 |
| 2016/0323578 A1* | 11/2016 | Kaneko | H04N 11/046 |
| 2017/0054984 A1* | 2/2017 | Park | H04N 19/98 |
| 2017/0070753 A1* | 3/2017 | Kaneko | H04N 19/146 |
| 2017/0230687 A1* | 8/2017 | Chen | H04N 19/182 |
| 2018/0084220 A1* | 3/2018 | Ikeda | H04N 5/772 |
| 2018/0109802 A1* | 4/2018 | Takeda | H04N 19/105 |
| 2018/0139471 A1* | 5/2018 | Ikeda | H04N 19/176 |
| 2018/0213228 A1* | 7/2018 | Bu | H04N 19/124 |
| 2019/0222862 A1 | 7/2019 | Shin et al. | |
| 2019/0268608 A1* | 8/2019 | Ma | H04N 19/51 |
| 2019/0273936 A1* | 9/2019 | Ma | H04N 19/51 |
| 2019/0373264 A1* | 12/2019 | Chong | H04N 19/91 |
| 2020/0099928 A1* | 3/2020 | Piao | H04N 19/176 |
| 2020/0107048 A1* | 4/2020 | Yea | H04N 19/169 |
| 2020/0260028 A1 | 8/2020 | Lee | |
| 2020/0275095 A1* | 8/2020 | Bokov | H04N 19/182 |
| 2021/0136297 A1* | 5/2021 | Park | H04N 23/632 |
| 2021/0201409 A1* | 7/2021 | Hoshizuki | H04L 9/3239 |

* cited by examiner

FIG. 14

| MIPI MODE NAME | MODE NUMBER | HEADER | | | |
|---|---|---|---|---|---|
| AD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| eMPD MODE | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eHVD MODE | MODE12 | 1 | 1 | 0 | 0 |
| | MODE13 | 1 | 1 | 0 | 1 |
| eHVA MODE | MODE14 | 1 | 1 | 1 | 0 |
| OD MODE | MODE4 | 0 | 1 | 0 | 0 |
| | MODE5 | 0 | 1 | 0 | 1 |
| eOUT MODE | MODE15 | 1 | 1 | 1 | 1 |
| OUT MODE | MODE7 | 0 | 1 | 1 | 1 |
| FNR MODE | MODE6 | 0 | 1 | 1 | 0 |

IMAGE SENSOR MODULE, IMAGE PROCESSING SYSTEM, AND IMAGE COMPRESSION METHOD

CROSS-REFERENCE TO RELATED APPLICATIONS

This application claims priority under 35 USC § 119 to Korean Patent Application No. 10-2020-0088451 filed on Jul. 16, 2020, and to Korean Patent Application No. 10-2021-0029046 filed on Mar. 4, 2021, each in the Korean Intellectual Property Office, the disclosures of which are incorporated by reference herein in their entireties.

FIELD

The present disclosure generally relates to image sensors, and more particularly relates to an image sensor module, an image processing system, and an image compression method which compress pixel data of an isolated region.

DISCUSSION OF RELATED ART

As interest in high-quality images and high-quality video have increased, the numbers of sensing pixels in pixel arrays included in image sensors has increased as well as sizes of image data generated by the image sensors. Image data may be transmitted to an image processing device where the image data may be compressed to increase transmission efficiency, and the compressed image data may be transmitted to the image processing device. The image data may include a variety of two-dimensional or multi-dimensional image patterns. In compressing pixel data included in a specific region of the image pattern, a compression method capable of increasing compression efficiency and reducing compression loss may be applied.

SUMMARY

Provided are an image sensor module, an image processing system, and an image compression method which may efficiently compress pixel data of an isolated region.

According to an embodiment of the present disclosure, there is provided an image compression method including receiving pixel values of a target pixel group to be compressed in the image data and reference values of reference pixels to be used for compression of the target pixel group, generating a virtual reference map by applying an offset value to each of the reference values, compressing the pixel values of the target pixel group based on the virtual reference map, and generating a bitstream based on a compression result and compression information based on the virtual reference map.

According to another embodiment of the present disclosure, there is provided an image sensor module including an image sensor configured to generate image data including a plurality of pixels, an encoder configured to generate compressed data including a plurality of bitstreams by sequentially compressing the image data generated by the image sensor in units of pixel groups and configured to compress a target pixel group to be compressed according to at least one encoding method among a plurality of encoding methods, and an interface configured to output the compressed data to an external image processing device, wherein the encoder generates a virtual reference map by applying an offset value to each of reference values of reference pixels arranged adjacent to a target pixel group according to a first encoding method among the plurality of encoding methods and compresses the target pixel group based on the virtual reference map.

According to another embodiment of the present disclosure, there is provided an image processing system including an image sensor configured to generate image data by sensing a received optical signal, an encoder configured to generate a plurality of bitstreams by sequentially compressing a plurality of pixel groups of the image data, and a decoder configured to reconstruct the image data by decompressing the plurality of bitstreams, wherein the encoder generates a virtual reference map by applying an offset value to each of reference values of reference pixels arranged adjacent to a target pixel group to be compressed and compresses the target pixel group based on the virtual reference map.

BRIEF DESCRIPTION OF THE DRAWINGS

Embodiments of the present disclosure will be more clearly understood from the following detailed description taken in conjunction with the accompanying drawings, in which:

FIG. 14 is a tabular diagram showing compression information according to an embodiment of the present disclosure;

DETAILED DESCRIPTION

Hereinafter, embodiments of the present disclosure will be described in detail with reference to the accompanying drawings.

Figure 1:
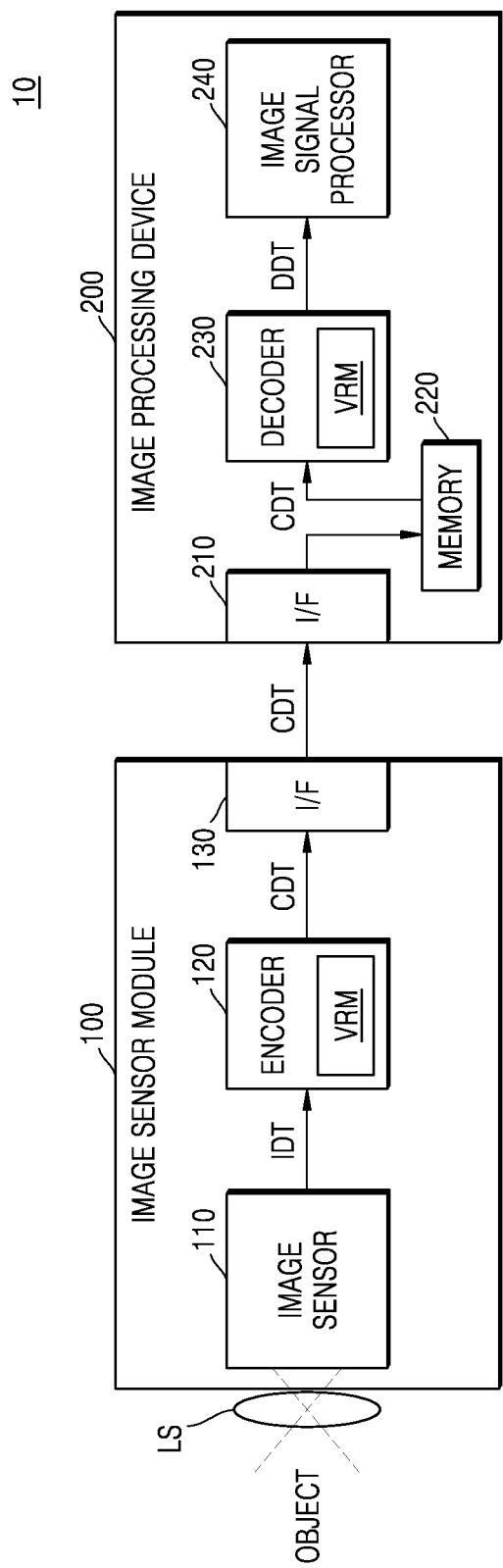
FIG. 1 is a block diagram showing an image processing system according to an embodiment of the present disclosure.
Figure 2:
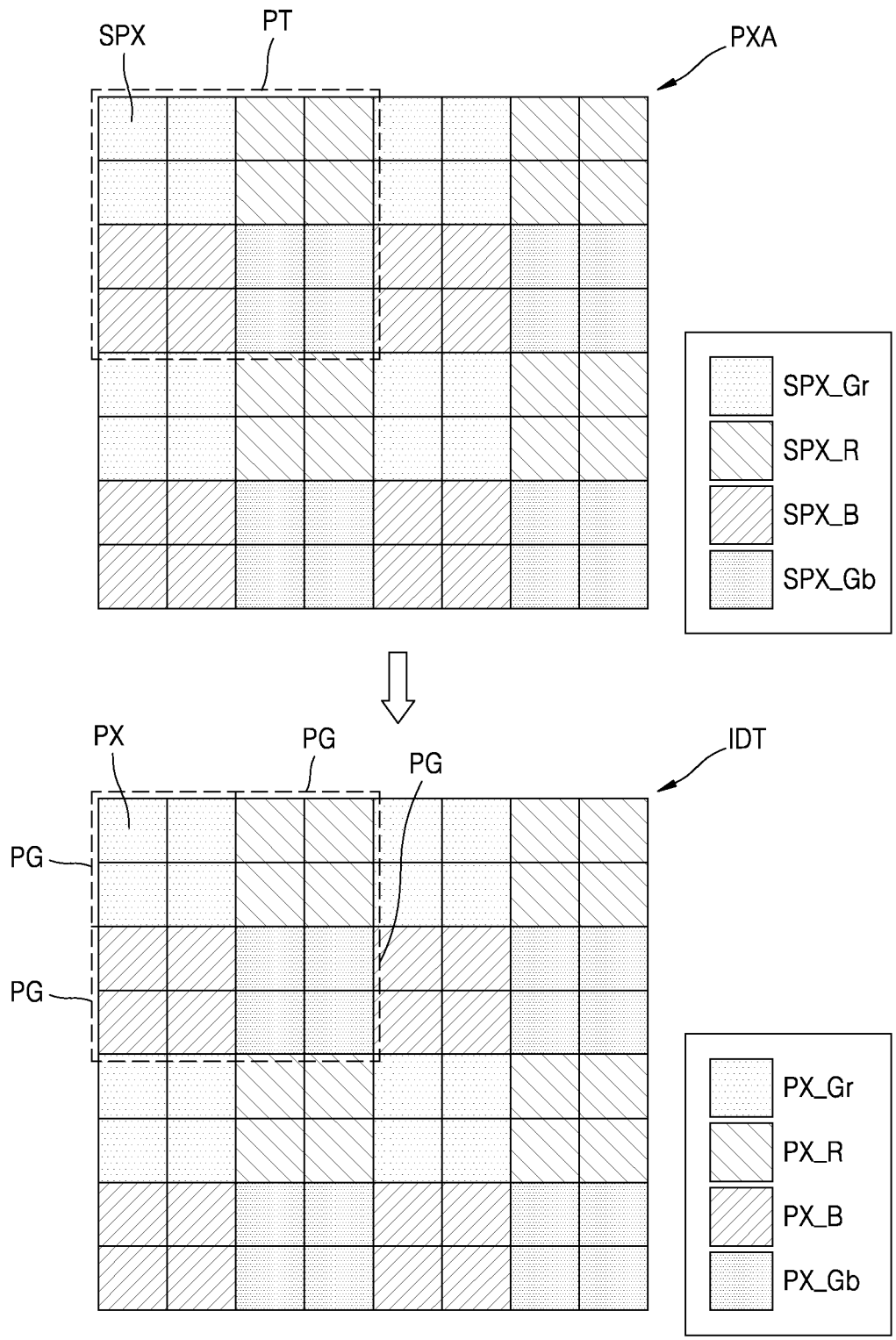
FIG. 2 is a hybrid diagram showing a pixel array and image data applied to an image sensor module according to an embodiment of the present disclosure.

FIG. 1 illustrates an image processing system according to an embodiment of the present disclosure, and FIG. 2 illustrates a pixel array and image data applied to an image sensor module according to an embodiment of the present disclosure.

An image processing system 10 may sense an image of an object or subject, store the sensed image in a memory and/or process the sensed image and store the processed image in the memory. According to an embodiment, the image processing system 10 may include a digital camera, a digital camcorder, a mobile phone, a tablet computer, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like. In addition, the image processing system 10 may be mounted, as a component, in an electronic apparatus such as a drone or an advanced driver assistance system (ADAS), a vehicle, furniture, a manufacturing facility, a door, various measurement apparatuses, or the like.

Referring to FIG. 1, the image processing system 10 may include an image sensor module 100 and an image processing device 200. In an embodiment, the image sensor module 100 may include an image sensor 110, an encoder 120, and an interface (I/F) 130. In an embodiment, the image sensor module 100 may include a plurality of semiconductor chips. For example, a pixel array PXA (in FIG. 2) of the image sensor 110 may be integrated on one semiconductor chip, and a logic circuit of the image sensor 110, the encoder 120, and the interface 130 may be integrated on another semiconductor chip, and a plurality of semiconductor chips may be electrically connected to each other through a connection member, or a plurality of semiconductor chips may be stacked to be electrically connected to each other by via metals passing therethrough. However, the present disclosure is not limited thereto, and the image sensor module 100 may include one single semiconductor chip.

In an embodiment, the image processing device 200 may include an interface (I/F) 210, a memory 220, a decoder 230, and an image signal processor 240.

The image sensor module 100 may image an external object or subject, and generate image data IDT. The image sensor module 100 may include the image sensor 110 capable of converting an optical signal of a subject which is incident thereon through a lens LS into an electrical signal.

The image sensor 110 may include the pixel array PXA of FIG. 2, in which a plurality of sensing pixels SPX are two-dimensionally arranged, and output the image data IDT including a plurality of pixel values corresponding to the plurality of sensing pixels, respectively, of the pixel array PXA.

The pixel array PXA may include a plurality of row lines, a plurality of column lines, and the plurality of sensing pixels SPX, which are arranged in a matrix form, each connected to the row line and the column line.

Each of the plurality of sensing pixels SPX of the pixel array PXA may sense an optical signal of at least one color among a plurality of reference colors. For example, the plurality of reference colors may include red, green, and blue or may include red, green, blue, and white and may also include other colors such as ultraviolet or infrared, without limitation thereto. For example, the plurality of reference colors may include cyan, yellow, green, and magenta. The pixel array PXA may generate pixel signals including information on a reference color of each of the plurality of sensing pixels SPX.

For example, as shown in FIG. 2, the pixel array PXA may include red sensing pixels SPX_R, blue sensing pixels SPX_B, and two types of green sensing pixels SPX_Gr and SPX_Gb. The green sensing pixels arranged in the same row as the red sensing pixels SPX_R may be referred to as first green sensing pixels PX_Gr, and the green sensing pixels arranged in the same row as the blue sensing pixels PX_B may be referred to as second green sensing pixels PX_Gb.

The red sensing pixels SPX_R, the blue sensing pixels SPX_B, the first green sensing pixels SPX_Gr, and the second green sensing pixels SPX_Gb may be arranged in a matrix, which are referred to as pixel patterns PT. A plurality of pixel patterns PT may be repeatedly arranged in the pixel array PXA.

For example, as shown in FIG. 2, the pixel patterns PT each include the red sensing pixels SPX_R arranged in a 2×2 matrix, the blue sensing pixels SPX_B arranged in a 2×2 matrix, the first green sensing pixels SPX_Gr arranged in a 2×2 matrix, and the second green sensing pixels SPX_Gb arranged in a 2×2 matrix. The pixel pattern PT may be referred to as a tetra pattern. However, the present disclosure is not limited thereto, and the pixel pattern PT may include a red sensing pixel SPX_R, a blue sensing pixel SPX_B, a first green sensing pixel SPX_Gr, and a second green sensing pixel SPX_Gb, arranged together in a 2×2 matrix, and the pixel pattern PT may be referred to as a Bayer pattern(see, e.g., FIG. 8). Alternatively, the pixel pattern PT may include the red sensing pixels SPX_R arranged in an n×n matrix (where n is an integer of 3 or more), the blue sensing pixels SPX_B arranged in an n×n matrix, the first green sensing pixels SPX_Gr arranged in an n×n matrix, and the second green sensing pixels SPX_Gb arranged in an n×n matrix.

The image data IDT may be generated based on pixel signals output from the pixel array PXA. The image data IDT may have a color pattern corresponding to the pixel pattern PT of the pixel array PXA. In one example, when the pixel array PXA has a Bayer pattern, the image data IDT may also have a Bayer pattern. In another example, when the pixel array PXA has a tetra pattern, the image data IDT may have a tetra pattern or it may have a Bayer pattern.

For example, when the pixel array PXA has a tetra pattern, one pixel signal may be output from four sensing pixels SPX of the same color included in the pixel pattern SPX, or four pixel signals may be output from the four sensing pixels SPX. When one pixel signal is output, the image data IDT may have a Bayer pattern, and when four pixel signals are output, the image data IDT may have a tetra pattern as shown in FIG. 2.

The image data IDT may include the red pixels PX_R, the blue pixels PX_B, the first green pixels PX_Gr, and the second green pixels PX_Gb that are repeatedly arranged. The pixel PX of the image data IDT may indicate data corresponding to the sensing pixel SPX of the pixel array PXA, that is, pixel data. The red pixel PX_R, the blue pixel PX_B, the first green pixel PX_Gr, and the second green pixel PX_Gb may correspond to the red sensing pixel SPX_R, the blue sensing pixel SPX_B, the first green sensing pixel SPX_Gr, and the second green sensing pixel SPX_Gb of the pixel array PXA.

The image data IDT may include a plurality of pixel groups PG, and the pixel groups PG may be sequentially arranged in a matrix according to a color pattern of the image data IDT, may be set to include a preset number of pixels PX arranged in one direction, or may be set to correspond to the same reference colors and to include pixels PX adjacent to each other.

For example, as shown in FIG. 2, when the image data IDT has a tetra pattern, the pixel group PG may be set to correspond to the same reference colors (for example, red, blue, green, and the like) and to include the four pixels PX adjacent to each other. In another example, when the image data IDT has a Bayer pattern, the pixel group PG may be set to include a preset number (for example, 4) of the pixels PX arranged in a matrix.

Referring back to FIG. 1, each of the plurality of sensing pixels SPX may include at least one photo-sensing or photoelectric conversion element. The photo-sensing element may sense light and convert the sensed light into an electric signal. For example, the photo-sensing element may be a photodiode, a phototransistor, a photo gate, a pinned photodiode (PPD), or a combination thereof.

Each of the plurality of sensing pixels SPX may include at least one photo-sensing element and a pixel circuit for outputting a pixel signal corresponding to an electrical signal generated by the photo-sensing element. For example, the pixel circuit may have a four-transistor structure that includes a transmission transistor, a reset transistor, an amplification transistor, and a selection transistor. However, the present disclosure is not limited thereto, and the pixel circuit may have a one-transistor structure, a three-transistor structure, a four-transistor structure, a five-transistor structure, or a structure in which a plurality of pixels share some transistors. In an embodiment, each pixel circuit may have a memory or an analog-to-digital converter.

In an embodiment, a plurality of color filters that transmit an optical signal of a specific wavelength band therethrough, such as an optical signal of a specific color, may be arranged on the plurality of pixels to correspond to the plurality of pixels, respectively, of the pixel array PXA, and at least one photo-sensing element included in the pixel may convert an optical signal transmitted through a corresponding color filter into an electrical signal. Accordingly, each of the plurality of sensing pixels SPX of the pixel array PXA may output at least one pixel signal for at least one assigned reference color. However, the present disclosure is not limited thereto, and at least one photo-sensing element included in the sensing pixel SPX may also selectively convert an optical signal of a specific wavelength band among incident light beams into an electrical signal.

In an embodiment, the image data IDT may include raw image data including a plurality of pixel values obtained by digital-analog-converting a plurality of pixel signals output from the pixel array PXA or may include image data obtained by pre-processing the raw image data.

The image sensor module 100 may use the encoder 120 to compress the image data IDT to increase a data transmission speed, to reduce power consumption according to data transmission, and to an efficient use of a data storage space and may transmit compressed data CDT to the image processing device 200.

The encoder 120 may receive the image data IDT from the image sensor 110 and compress the image data IDT to generate the compressed data CDT. The compressed data CDT may have a form of an encoded bitstream. Hereinafter, the encoded bitstream may be referred to as a bitstream. The bitstream may include a compression result and compression information (for example, mode information indicating a compression method).

The encoder 120 may generate the compressed data CDT by encoding the image data IDT in units of pixel groups PG. The encoder 120 may generate one bitstream by encoding one pixel group PG and generate the compressed data CDT based on the bitstreams of some or all of the pixel groups PG in the image data IDT. The pixel group PG is compressed by encoding the pixel group PG, and in the present disclosure below, encoding may be used in the same meaning as compression.

The encoder 120 may perform compression by using a reference map generated based on pixel values corresponding to pixels compressed earlier than a pixel group PG to be compressed, that is, a target pixel group. The encoder 120 may compress a pixel value of a target pixel based on a reference value of at least one reference pixel adjacent to at least one target pixel in the target pixel group in the reference map. The reference value may be generated based on the pixel value of the reference pixel, and for example, the reference value may be a value generated when the pixel value of the reference pixel is compressed and then decompressed.

It is likely but not necessary that the pixel value of the target pixel and the pixel value of the adjacent reference pixel have similar values to each other. In addition, the pixel values of the target pixels in the target pixel group may be likely to have similar values to each other. Accordingly, the encoder 120 may compress a target pixel group by using a differential pulse code modulation (DPCM) method of encoding target pixels of the target pixel group based on a difference between neighboring pixels, for example, a difference value between a pixel value of the target pixel and a reference value of an adjacent reference pixel, or a difference value between the pixel value of the target pixel and a pixel value of another target pixel in the target pixel group. Accordingly, compression efficiency (or compression rate) may be increased, and data loss due to compression may be reduced.

However, pixel values of pixels of a target pixel group included in an isolated region in the image data IDT may differ significantly from pixel values of reference pixels. In other words, a correlation between the pixel values of the target pixels and the reference values of the reference pixels may be reduced.

Here, the isolated region indicates a region corresponding to an edge region in at least two directions (for example, two directions orthogonal to each other) among edge regions of a two-dimensional or multidimensional image pattern generated in the image data IDT.

When there is a large difference between the pixel values of the target pixels and the reference values of the reference pixels, the encoder 120 according to an embodiment of the present disclosure may generate a virtual reference map (VRM) by applying an offset value to each of the reference values included in the reference map and may compress the target pixel group by using a DPCM method or another encoding method, based on the VRM. The VRM may include compensated reference values in which a difference between the pixel value of the target pixel and the reference values of the reference pixels is reduced due to an offset value. As such, the encoding method based on the virtual reference map according to an embodiment of the present disclosure may be referred to as an offset encoding method. The offset encoding method may be described in detail with reference to FIGS. 4A to 10.

When the encoder 120 compresses the pixel group of the isolated region by using the DPCM method described above, or when the encoder 120 compresses the pixel group of the isolated region by using a method of performing encoding based on some upper data bits including the most significant bit (MSB) among a plurality of data bits representing pixel values of the respective target pixels, a large amount of data loss may occur. Accordingly, the quality of a reconstructed image data generated by decompressing the compressed data CDT may be reduced, and artifacts may occur in the image data. However, as described above, when the encoder 120 compresses the pixel group in the isolated region by using the offset encoding method according to an embodiment of the present disclosure, compression efficiency may be increased and data loss may be reduced.

The encoder 120 may provide the compressed data CDT to the image processing device 200 through the interface 130. For example, the interface 130 may include a camera serial interface (CSI) based on a mobile industry processor interface (MIPI). However, the interface 130 is not limited thereto and may be implemented according to various protocol standards.

The image processing device 200 may generate an image to be displayed on a display (not shown) by converting the compressed data CDT received from the image sensor module 100. The image processing device 200 may receive the compressed data CDT from the image sensor module 100, decompress the compressed data CDT to generate decompressed data DDT, for example, reconstructed image data, and perform image processing on the decompressed data DDT.

In an embodiment, the image processing device 200 may receive the compressed data CDT from the image sensor module 100 through the interface 210. The interface 210 may include a MIPI such as the interface 130 included in the image sensor module 100 but is not limited thereto. The image processing device 200 may store the received compressed data CDT in the memory 220.

The memory 220 is a storage location for storing data. The compressed data CDT may be stored in the memory 220. In addition, the memory 220 may store other data, for example, an operating system (OS), various programs, and various data (for example, compressed data CDT). The memory 220 may include a volatile memory such as dynamic random access memory (DRAM) or static RAM (SRAM), or a non-volatile memory such as phase change RAM (PRAM), resistive RAM (ReRAM), and magnetic RAM (MRAM) flash memory. In addition, although FIG. 1 shows that the memory 220 is included in the image processing device 200, the present disclosure is not limited thereto, and the memory 220 may be separately provided outside the image processing device 200.

The decoder 230 may read the compressed data CDT from the memory 220 and decompress the compressed data CDT to generate the decompressed data DDT. The decoder 230 may provide the decompressed data DDT to the image signal processor 240.

The decoder 230 may decompress the compressed data CDT in units of the pixel groups PG by using a decompression method (or decoding method) according to a compression method (or encoding method) performed by the encoder 120 of the image sensor module 100. In this case, the decoder 230 may determine a compression method applied to the pixel group PG based on compression information included in the bitstream of the compressed data CDT. The decoder 230 may decompress target pixels of a target pixel group based on a reference map including reference values corresponding to the pixels decompressed earlier than a target pixel group to be decompressed, that is, the reference pixels.

In an embodiment, the decoder 230 may generate a virtual reference map (VRM) by applying an offset value to each of reference values of reference pixels and may decompress the target pixel group based on the VRM. In this case, the offset value may be equal to the offset value used by the encoder 120.

The image signal processor 240 may perform various image processing on the received decompressed data DDT. In a non-limiting example, the image signal processor 240 may perform at least one image processing on the decompressed data DDT among bad pixel correction, offset correction, lens distortion correction, color gain correction, shading correction, gamma correction, denoising, and sharpening. In an embodiment, some of the above-described image processing may be omitted depending on performances of the image sensor module 100. For example, when the image sensor module 100 includes the image sensor 110 with high quality, the bad pixel correction (particularly, static bad pixel correction), the offset correction, or the like among image processing may be omitted.

Each of the encoder 120 and the decoder 230 may be implemented by software or hardware, or a combination of software, such as firmware, and hardware. When the encoder 120 and the decoder 230 are implemented in software, each of the above-described functions may be implemented in programmed source code to be stored in a storage medium included in each of the image sensor module 100 and the image processing device 200, and functions of the encoder 120 and the decoder 230 may be performed by executing software by a processor (for example, an image processing processor) included in each of the image sensor module 100 and the image processing device 200. When the encoder 120 and the decoder 230 are implemented in hardware, the encoder 120 and the decoder 230 may include a logic circuit and a register to perform each of the above-described functions based on register settings.

In addition, although FIG. 1 shows that the image processing system 10 includes the image sensor module 100 and the image processing device 200, the present disclosure is not limited thereto. For example, the image processing system 10 may include a part, but need not include all, of the image sensor module 100 and the image processing device 200 or may include a plurality of image sensor modules 100. In addition, although FIG. 1 shows that the decoder 230 and the image signal processor 240 have separate configurations, the present disclosure is not limited thereto. For example, the image signal processor 240 may include the decoder 230.

Figure 3A:
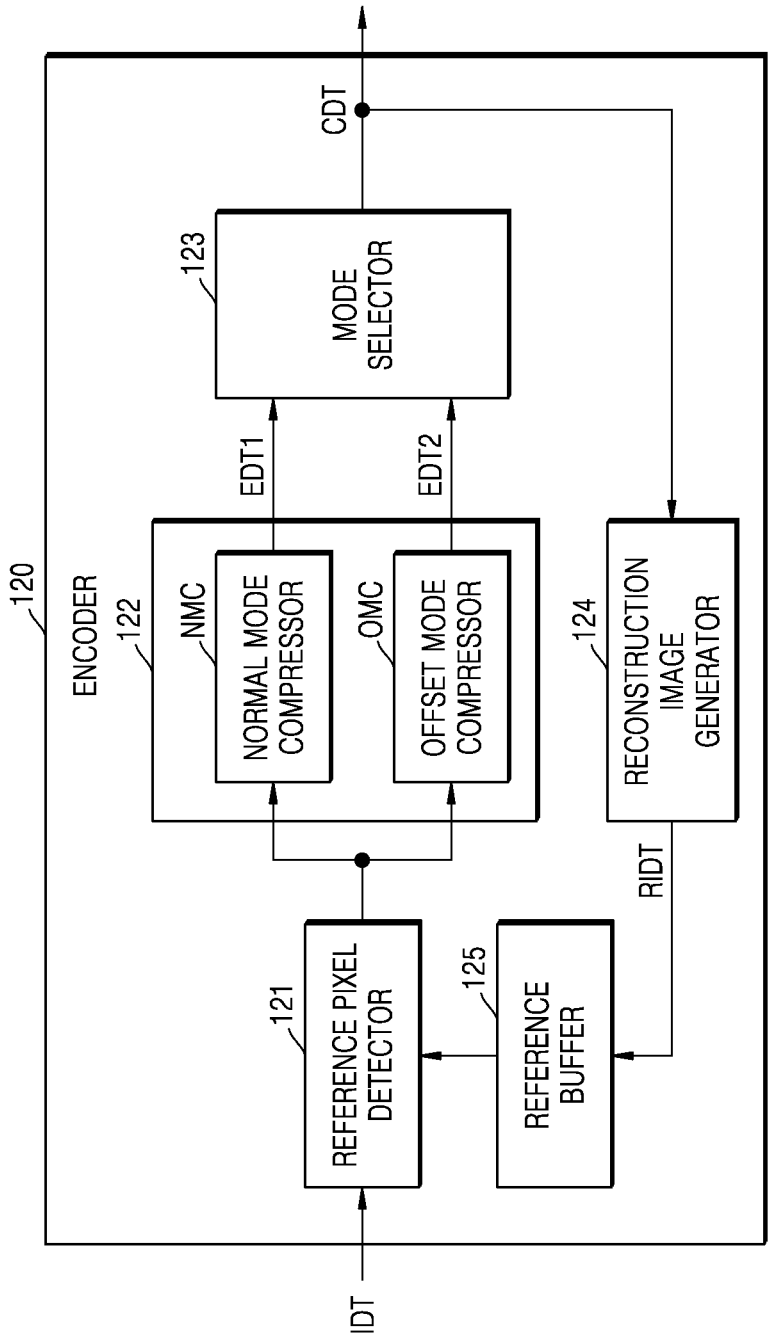
FIG. 3A is a block diagram showing an encoder according to an embodiment of the present disclosure.
Figure 3B:
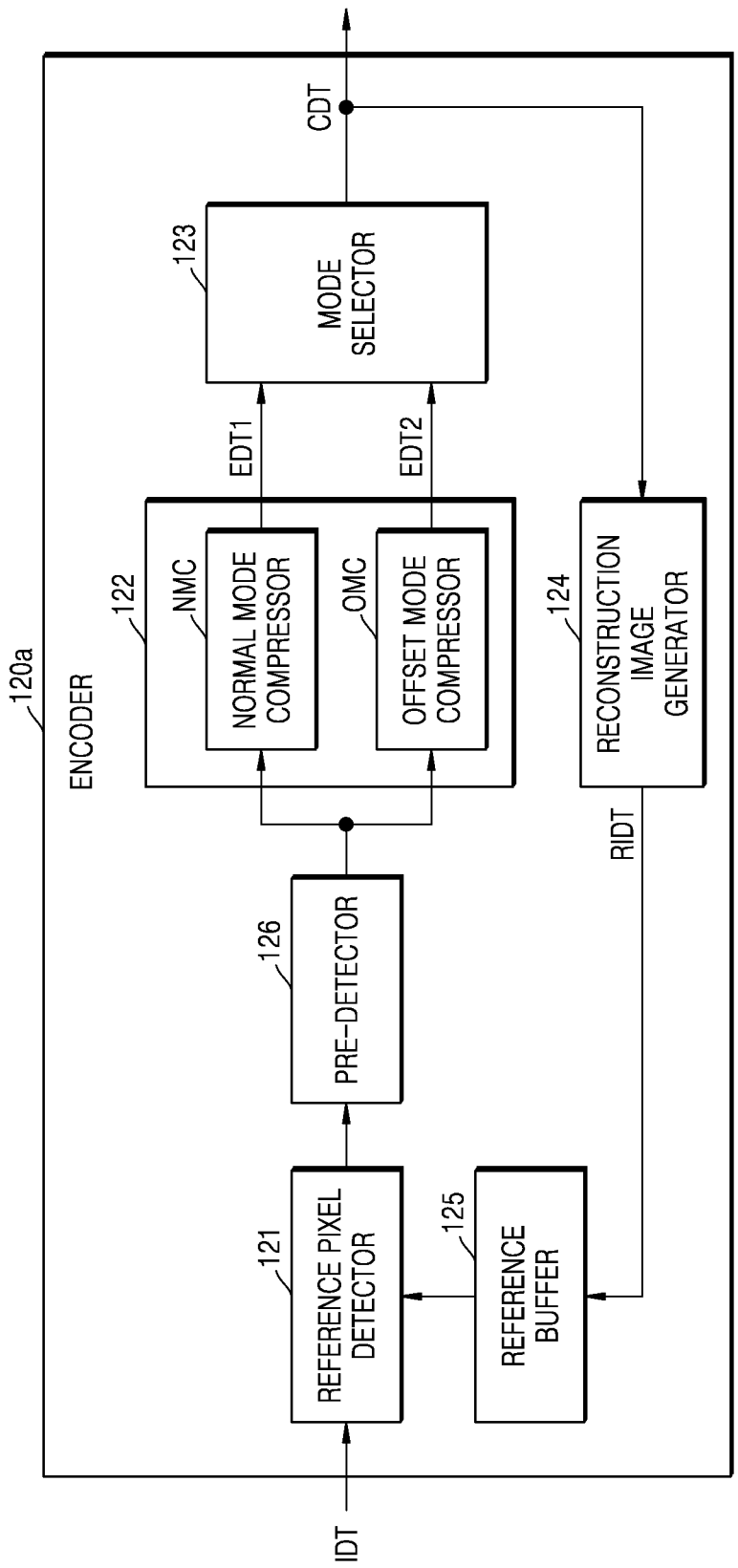
FIG. 3B is a block diagram showing an encoder according to an embodiment of the present disclosure.

FIGS. 3A and 3B illustrate encoders according to embodiments of the present disclosure. FIGS. 3A and 3B show examples of the encoder 120 of FIG. 1.

Referring to FIGS. 1 and 3A, the encoder 120 may include a reference pixel detector 121, a compression circuit 122, a mode selector 123, a reconstruction image generator 124, and a reference buffer 125.

The reference pixel detector 121 may receive the image data IDT from the image sensor 110 in FIG. 1 and may receive a reference map including reference values of reference pixels used for compression of a target pixel group from the reference buffer 125. The reference pixel detector 121 may detect the reference values of the reference pixels that are positionally adjacent to the target pixel group from the reconstructed image data stored in the reference buffer 125, that is, the reconstructed pixel values of the reference pixels, and may receive the reference values from the reference buffer 125 as a reference map. The reference pixel detector 121 may provide a target pixel group and a reference map of the image data IDT to the compression circuit 122.

The compression circuit 122 may compress the target pixel group based on the reference map. The compression circuit 122 may include an offset mode compressor OMC and a normal mode compressor NMC, which may be arranged in parallel with each other without limitation thereto. The offset mode compressor OMC and the normal mode compressor NMC may compress a target pixel group by using different compression or encoding methods, such as by performing the methods in parallel with each other but without limitation thereto.

As described above with reference to FIG. 1, the offset mode compressor OMC may encode the target pixel group by using an offset encoding method based on the VRM. For example, the offset mode compressor OMC may generate the VRM by applying an offset value to reference values of a reference map and may encode the target pixel group by using the DPCM method based on the VRM. After the target pixel group is compressed, the VRM may be removed.

The normal mode compressor NMC may encode the target pixel group by using the DPCM method based on the reference map. The normal mode compressor NMC may output first encoded data EDT1, and the offset mode compressor OMC may output second encoded data EDT2.

Although FIG. 3A shows that the compression circuit 122 includes the offset mode compressor OMC and the normal mode compressor NMC, the present disclosure is not limited thereto, and the compression circuit 122 may further include a compressor for encoding the target pixel group by using an encoding method that is different from the offset mode compressor OMC and the normal mode compressor NMC.

The mode selector 123 may select compressed data received from the compression circuit 122, for example, one of the first encoded data EDT1 and the second encoded data EDT2, and may output the selected encoded data as the compressed data CDT.

The mode selector 123 may decode the first encoded data EDT1 and the second encoded data EDT2 by using a decoding method according to the encoding method and may select one of the first encoded data EDT1 and the second encoded data EDT2 based on an error rate according to the decoding. The error rate refers to a difference between the decoded data, that is, the decoded pixel values and pixel values that are not decoded, and the smaller the difference, the lower the error rate. As the error rate is reduced, the quality of the decompressed data DDT generated by the image processing device 200, that is, quality of the reconstructed image data, is reduced. Accordingly, the mode selector 123 may select the encoded data with a low error rate among the first encoded data EDT1 and the second encoded data EDT2 as the compressed data CDT and may output the compressed data CDT.

In an embodiment, the normal mode compressor NMC (or another compressor) may generate encoded data by encoding a target pixel group, for example, the first encoded data EDT1, and when an error rate of the first encoded data EDT1 exceeds a reference error rate, the offset mode compressor OMC may operate. The offset mode compressor OMC may generate the second encoded data EDT2 by encoding the target pixel group. When the error rate of the first encoded data EDT1 is less than or equal to the reference error rate, the mode selector 123 may output the first encoded data EDT1 as the compressed data CDT. When the error rate of the first encoded data EDT1 exceeds the reference error rate, the mode selector 123 may output the second encoded data EDT2 received from the offset mode compressor OMC as the compressed data CDT.

The reconstruction image generator 124 may generate the reconstructed image data by decoding the compressed data CDT. The reconstruction image generator 124 may reconstruct pixel values of a target pixel group by decoding each of a plurality of bitstreams included in the compressed data CDT by using a decoding method corresponding to the encoded method. Pixels corresponding to the reconstructed pixel values may be used as reference pixels of another target pixel group to be compressed.

The reference buffer 125 may store the reconstructed image data and may provide reference values of reference pixels used for compression of the target pixel group to the reference pixel detector 121. In an embodiment, the reference buffer 125 may include a line memory and may store the reference pixels located around the target pixels of the target pixel group. In the embodiment, the reference buffer 125 may include a volatile memory such as DRAM or SRAM. In addition, the present disclosure is not limited thereto, and the reference buffer 125 may include a non-volatile memory such as ReRAM or PRAM.

Referring to FIG. 3B, an encoder 120a may include the reference pixel detector 121, a pre-detector 126, the compression circuit 122, the mode selector 123, the reconstruction image generator 124, and the reference buffer 125. Compared to the encoder 120 of FIG. 3A, the encoder 120a may further include the pre-detector 126. Operations of the reference pixel detector 121, the compression circuit 122, the mode selector 123, the reconstruction image generator 124, and the reference buffer 125 are described with reference to FIG. 3A, and thus, redundant descriptions thereof are omitted.

The pre-detector 126 may activate or deactivate the offset mode compressor OMC. In an embodiment, the pre-detector 126 may activate or deactivate the offset mode compressor OMC based on reference values of reference pixels. For example, when a difference between the reference values and a pixel value of a target pixel is greater than or equal to a threshold (or a specific code value), the offset mode compressor OMC may be activated, and when the difference is less than the threshold, the offset mode compressor OMC may be deactivated. In an embodiment, the pre-detector 126 may include a register and may activate or deactivate the offset mode compressor OMC based on a control signal stored in a register. For example, the control signal may be received from the image processing device 200.

When the offset mode compressor OMC is deactivated, another compressor included in the compression circuit 122, such as the normal mode compressor NMC, may encode the target pixel group, and the encoded data, that is, the first encoded data EDT1, may be output as the compressed data CDT.

When the offset mode compressor OMC is activated, at least some of the compressors included in the compression circuit 122 and the offset mode compressor OMC respectively encode the target pixel group, and the mode selector 123 may output the encoded data with the lowest error rate among the encoded data as the compressed data CDT.

In an embodiment, even when the offset mode compressor OMC is activated, a priority of the offset mode compressor OMC among the compressors included in the compression circuit 122 may be lowered. For example, the normal mode compressor NMC first encodes the target pixel group to generate the first encoded data EDT1, and when an error rate of the first encoded data EDT1 exceeds the reference error rate, the offset mode compressor OMC may operate. The offset mode compressor OMC may generate the second encoded data EDT2 by encoding the target pixel group. When the error rate of the first encoded data EDT1 is less than or equal to the reference error rate, the mode selector 123 may output the first encoded data EDT1 as the compressed data CDT. When the error rate of the first encoded data EDT1 exceeds the reference error rate, the mode selector 123 may output the second encoded data EDT2 received from the offset mode compressor OMC as the compressed data CDT.

In an embodiment, when the offset mode compressor OMC is activated, another compressor included in the compression circuit 122, for example, the normal mode compressor NMC is deactivated, and the second encoded data EDT2 generated by the offset mode compressor OMC may be output as the compressed data CDT. Accordingly, power consumption of the encoder 120 may be reduced.

Figure 4A:
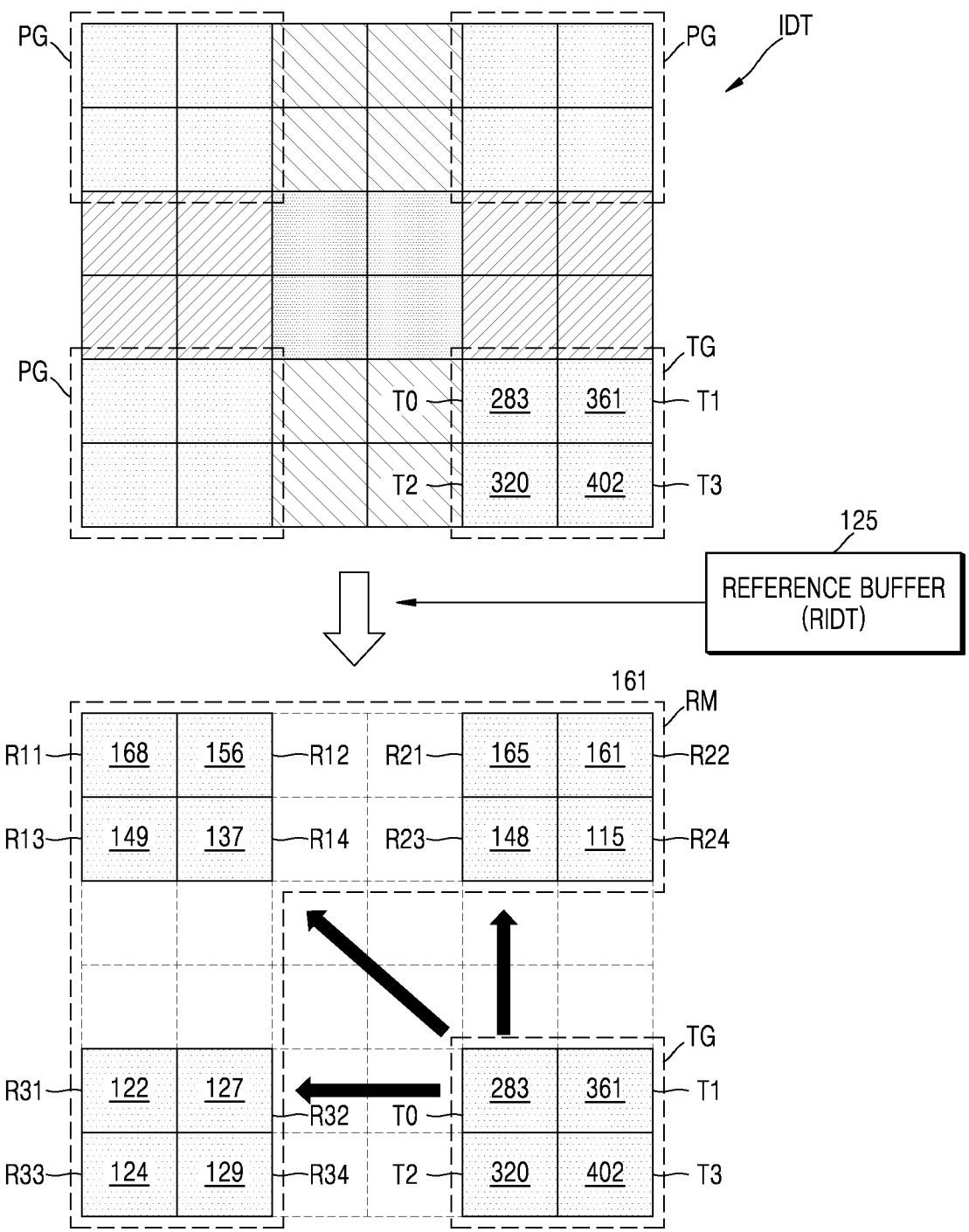
FIG. 4A is a hybrid diagram showing an example of a reference map according to an embodiment of the present disclosure.
Figure 4B:
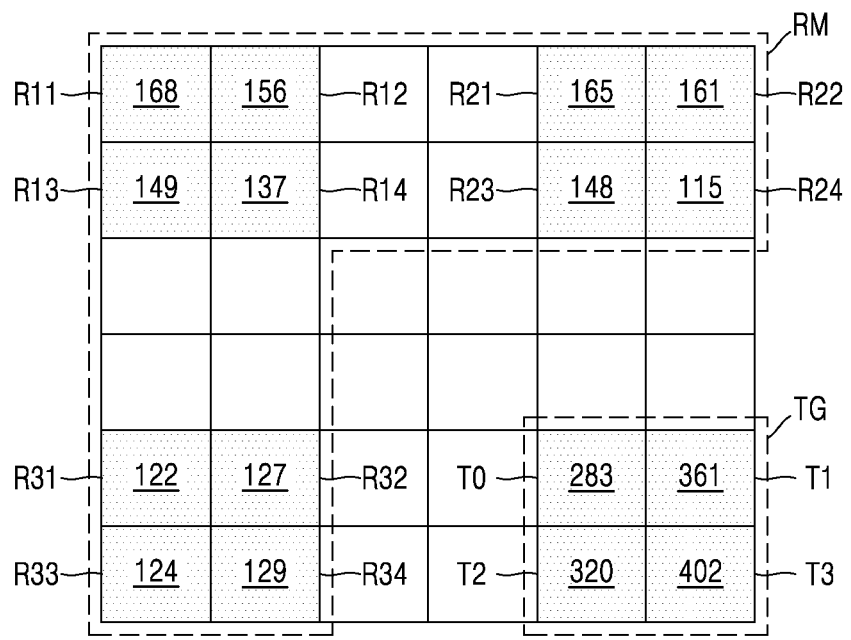
FIG. 4B is a hybrid diagram showing an example of a virtual reference map according to an embodiment of the present disclosure.
Figure 4B:
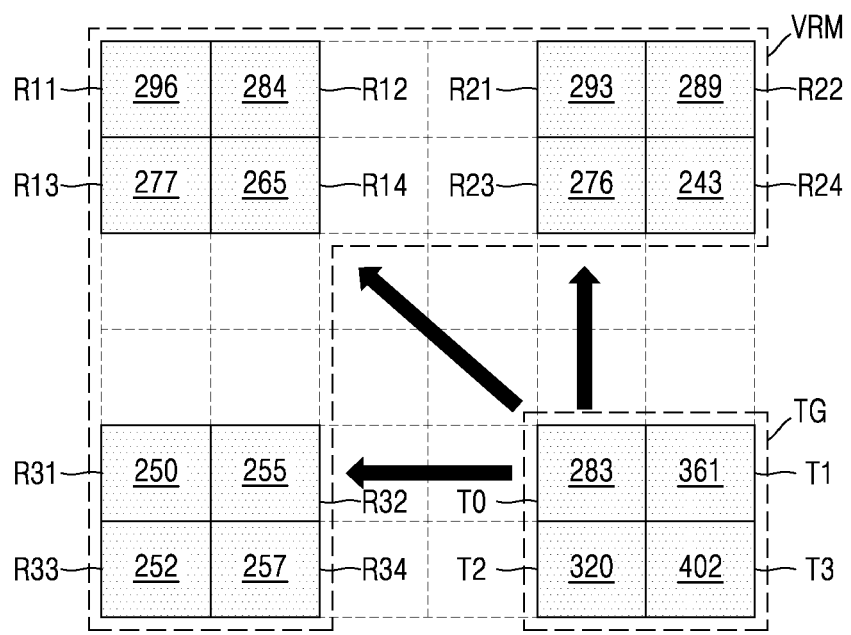

FIGS. 4A and 4B illustrate examples of a reference map and a VRM according to an embodiment of the present disclosure. In FIGS. 4A and 4B, numbers in parentheses indicate pixel values, that is, pixel values, reference values, or compensated reference values.

Referring to FIG. 4A, the image data IDT may include a plurality of pixel groups PG, and the plurality of pixel groups PG may be sequentially compressed according to a set direction. In an embodiment, the image data IDT may be sequentially compressed in units of the pixel groups PG in a left-to-right direction and an up-down direction. However, the present disclosure is not limited thereto, and the image data IDT may be sequentially compressed in a right-left direction or a bottom-up direction.

The target pixel group TG, such as target pixels T0, T1, T2, and T3 of the target pixel group TG, may be compressed. The target pixel group TG may be compressed based on pixels included in the pixel groups PG corresponding to the same color among the neighboring compressed pixel groups PG. Neighboring pixels used for compression of the target pixel group TG may be referred to as reference pixels.

The reference values of the reference pixels adjacent to the target pixel group TG among the reconstructed image data RIDT stored in the reference buffer 125 may be generated as a reference map RM. Here, the reference value refers to a value generated when a pixel value is compressed and then decompressed. For example, the reference map RM may include reference values of reference pixels (for example, R11, R12, R13, R14, R21, R22, R23, R24, R31, R32, R33, and R34).

The target pixel group TG may be compressed based on the reference map RM. For example, the target pixel group TG or the target pixel T0 of the target pixel group TG may be encoded based on the more relevant reference value among the reference values of adjacent reference pixels R13, R14, R23, R24, R32, and R34 or reference values of the reference pixels adjacent to each other in a preset direction.

In addition, a difference between the pixel values of the target pixels T0, T1, T2, and T3 of the target pixel group TG and the reference values of the reference pixels may be large. For example, a pixel value of the target pixel T0 is 283, reference values of adjacent reference pixels R14, R23, and R32 are 137, 148, and 127, respectively, and when a threshold is set to 125, a difference between the pixel value and the reference values is greater than or equal to 125, and thus, the target pixel group TG may correspond to an isolated region. The target pixel group TG may be compressed based on a VRM in FIG. 4B. For example, the offset mode compressor OMC of FIG. 3 may generate the VRM based on the reference map RM and compress the target pixel group TG based on the VRM.

Referring to FIG. 4B, the VRM may be generated by applying an offset value to each of the reference values of the reference pixels (for example, R11, R12, R13, R14, R21, R22, R23, R24, R31, R32, R33, and R34). It is assumed that the offset value is 128. The offset value may be a positive value or a negative value.

Compensated reference values may be generated by adding an offset value to each of the reference values of the reference pixels (for example, R11, R12, R13, R14, R21, R22, R23, R24, R31, R32, R33, and R34), and the VRM may include the compensated reference values. A pixel value of a target pixel may be similar to a compensated reference value, and a correlation between the pixel value and the compensated reference value may be increased.

As described above, when the target pixel group TG corresponds to an isolated region and has a low correlation with the reference map RM, the offset mode compressor OMC may generate the VRM with a high correlation by applying an offset value to the reference map RM and may compress the target pixel group TG based on the VRM.

Figure 5A:
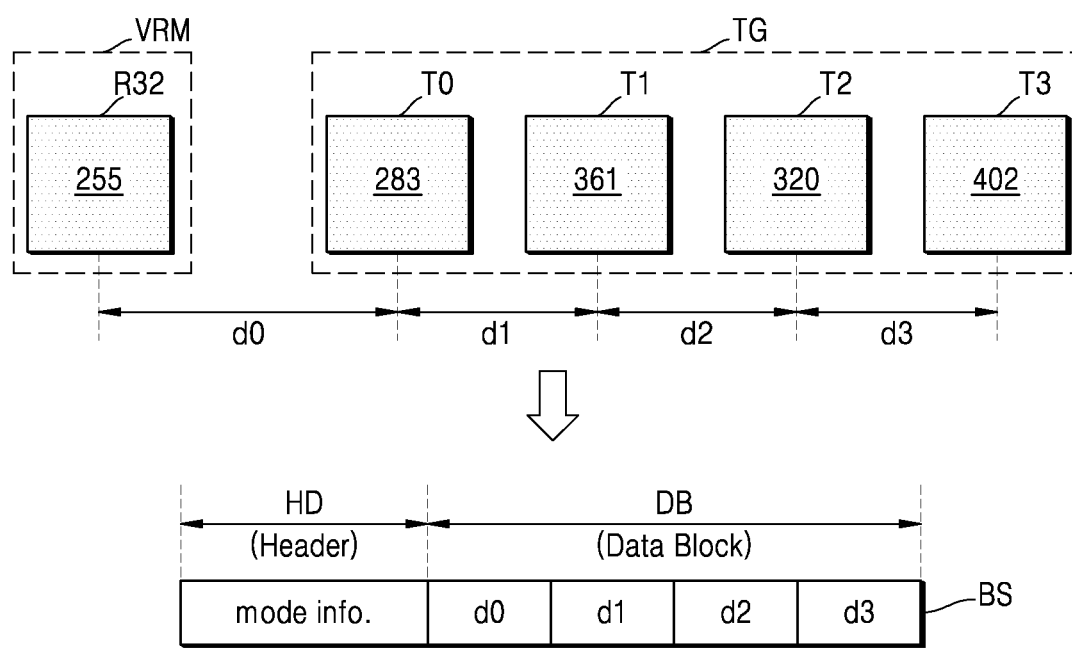
FIG. 5A is a conceptual diagram showing a compression method according to an embodiment of the present disclosure.
Figure 5B:
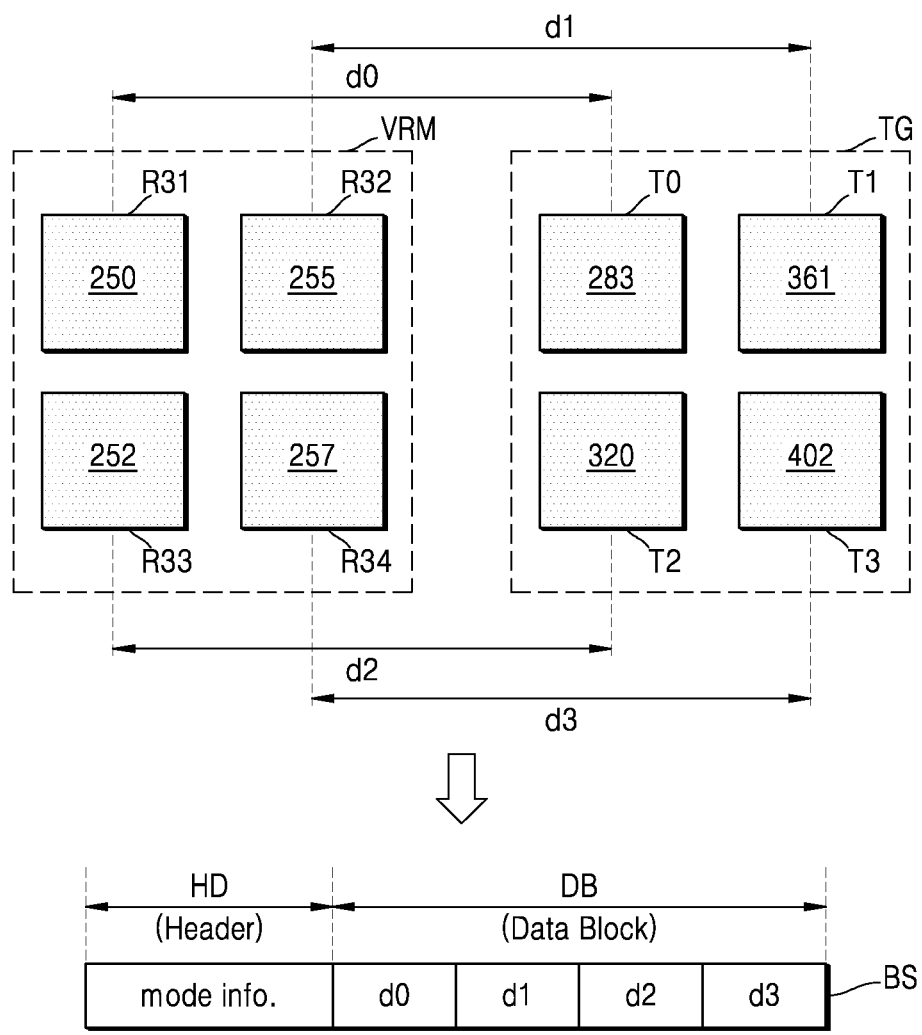
FIG. 5B is a conceptual diagram showing a compression method according to an embodiment of the present disclosure.

FIGS. 5A and 5B illustrate compression methods according to embodiments of the present disclosure. The compression methods to be described in the present disclosure may be performed by the offset mode compressors OMC of FIGS. 3A and 3B and may be performed based on the DPCM method.

Referring to FIGS. 5A and 5B, the offset mode compressor OMC may compress the target pixels T0, T1, T2, and T3 of the target pixel group TG, based on a compensated reference value of at least one reference pixel included in the VRM.

Referring to FIG. 5A, the reference pixel R32 of the VRM may be used for compression of the target pixel group TG. For example, the reference pixel R32 may correspond to the same color as the target pixel group TG and may be a reference pixel included in a pixel group for which compression is performed immediately before.

The offset mode compressor OMC may calculate a difference value d0 between a compensated reference value of the reference pixel R32 and a pixel value of the target pixel T0. For example, the compensated reference value 255 may be subtracted from the pixel value 283, and a difference value d0 may be 28. In this case, when the pixel value is less than the compensated reference value, the difference value d0 may have a negative value. Alternatively, the difference value d0 may be generated by subtracting the pixel value from the compensated reference value.

The offset mode compressor OMC may calculate difference values d1, d2, and d3 between the target pixels T0, T1, T2, and T3. The offset mode compressor OMC may generate a bitstream BS for the target pixel group TG based on the difference value d0 between a compensated reference value of the reference pixel R32 and a pixel value of the target pixel T0, and the difference values d1, d2, and d3 between the target pixels T0, T1, T2, and T3.

Referring to FIG. 5B, a plurality of reference pixels of the VRM, for example, the reference pixels R31, R32, R33, and R34, may be used for compression of the target pixel group TG. For example, the reference pixels R31, R32, R33, and R34 may correspond to the same color as the target pixel group TG and may be reference pixels included in a pixel group for which compression is performed immediately before.

The offset mode compressor OMC may calculate the difference values d0, d1, d2, d3, and d4 between compensated reference values of the reference pixels R31, R32, R33, and R34 and pixel values of the target pixels T0, T1, T2, and T3 of the target pixel group TG.

The offset mode compressor OMC may calculate the bitstream BS for the target pixel group TG based on the difference values d0, d1, d2, d3, and d4 between the compensated reference values of the reference pixels R31, R32, R33, and R34 and the pixel values of the target pixels T0, T1, T2, and T3.

The bitstream BS may include a header HD and a data block DB. The header HD may include compression information, for example, mode information including an encoding method (for example, a DPCM method, an offset mode method, or the like) used for compression, a compression rate, loss information, and the like, and the data block DB may include information according to pixel values of the target pixels T0, T1, T2, and T3, for example, a plurality of difference values d0, d1, d2, and d3.

When the bitstream BS is transmitted to the image processing device 200 in FIG. 1 as the compressed data CDT, the decoder 230 in FIG. 1 may determine a compression method (that is, an encoding method) of the bitstream BS based on the mode information included in the header HD, and may decompress the compressed data CDT by decoding the bit stream BS based on a decompression method (that is, a decoding method) corresponding to the compression method and the information included in the data block DB.

Figure 6A:
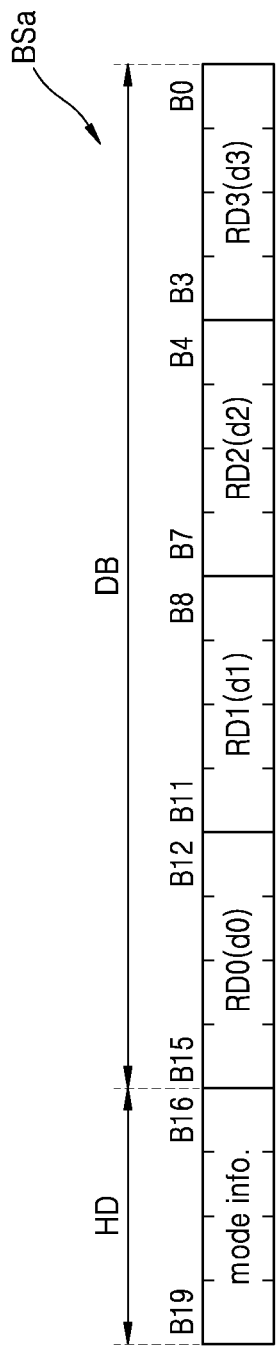
FIG. 6A is a conceptual diagram showing a bitstream according to an embodiment of the present disclosure.
Figure 6B:
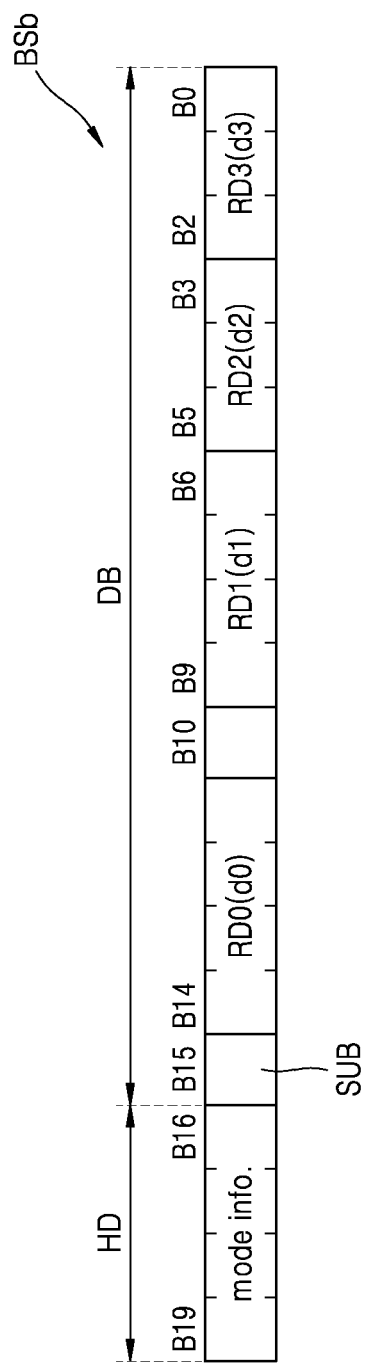
FIG. 6B is a conceptual diagram showing a bitstream according to an embodiment of the present disclosure.

FIGS. 6A and 6B illustrate bitstreams according to embodiments of the present disclosure. FIGS. 6A and 6B show implementation examples of the bitstream BS of FIG. 5. The image data IDT, that is, pixel values of the target pixel (for example, T0, T1, T2, and T3) before compression is performed is represented as data including 10 bits, and as the target pixel group TG is compressed at a compression rate of 50%, it is assumed that the bitstream BS is data including 20 bits.

Referring to FIGS. 6A and 6B, the data blocks DB of the bitstream BSa and BSb may be allocated to a first bit to a sixteenth bit B0 to B15, and headers HD thereof may be allocated to the 17th bit to the 20th bits B16 to B19.

As described above, the header HD may include mode information. For example, as 4 bits are allocated to the header HD, the header HD may include one of $2^4$ (=16) pieces of mode information.

The data block DB may include a plurality of residual regions, for example, first to fourth residual regions RD0, RD1, RD2, and RD3. For example, the difference values d0, d1, d2, and d3 calculated in FIG. 5 may be included in the first to fourth residual regions RD0, RD1, RD2, and RD3, respectively. In the present disclosure, values (for example, difference values) included in the bitstream BSa may be represented as negative and positive numbers by a most significant sign bit notation, without limitation thereto. For example, when the difference value is represented as data of four bits, the most significant bit may indicate a sign and the remaining 3 bits may indicate an absolute value. The difference value may be represented as a binary code of 4 bits representing an integer from −8 to 7. However, the present disclosure is not limited thereto, and a one's complement method, an absolute value method, or the like may be used.

In an embodiment, the first to fourth residual regions RD0, RD1, RD2, and RD3 may be allocated to the same number of bits. For example, the fourth residual region RD3 may be allocated to the first to fourth bits B0 to B3, the third residual region RD2 may be allocated to the fifth to eighth bits B4 to B7, the second residual region RD1 may be allocated to the 9th to 12th bits B8 to B11, and the first residual region RD0 may be allocated to the 13th to 16th bits B12 to B15.

Referring to FIG. 6B, the data block DB may include a plurality of residual regions, for example, first to fourth residual regions RD0, RD1, RD2, and RD3, and an additional region SUB. In an embodiment, the first to fourth residual regions RD0, RD1, RD2, and RD3 may be allocated to different numbers of bits. For example, the fourth residual region RD3 may be allocated to the first to third bits B0 to B2, the third residual region RD2 may be allocated to the fourth to sixth bits B3 to B5, the second residual region RD1 may be allocated to the seventh to tenth bits B6 to B9, and the first residual region RD0 may be allocated to the 11th to 15th bits B10 to B14. In FIGS. 5A and 5B, the difference value d0 between a compensated reference value of the reference pixel R32 and a pixel value of the target pixel T0 may be greater than the difference values d1, d2, and d3 between the relatively adjacent target pixels T0, T1, T2, and T3. Accordingly, the largest number of bits may be allocated to the first residual region RD0.

The additional region SUB may be allocated to the 16th bit B15. The additional region SUB may include a code indicating an amount (for example, amount to be shifted to the right or the left) required to be shifted when the difference values d0, d1, d2, and d3 included in the first to fourth residual regions RD0, RD1, RD2, and RD3 are decoded. For example, when a code of the additional region SUB is "0", this indicates that there is no shift, and when the code of the additional region SUB is "1", the difference values d0, d1, d2, and d3 are set to be shifted to the left twice, if the code (for example, binary code) of the additional region SUB is "1" and the difference value d0 is "110100", a code value included in the second residual region RD1 may be "1101". In this example, the most significant bit represents a sign, and thus, there is no shifting.

When reconstructing the compressed data CDT, the decoder 230 (in FIG. 1) of the image processing device 200 (in FIG. 1) may calculate values obtained by performing a left shift operation for values read from the first to fourth residual regions RD0, RD1, RD2, and RD3 twice as the difference values d0, d1, d2, and d3 by considering the code of the additional region SUB. For example, the decoder 230 may generate a code value "110100" by performing a left shift operation twice on "101" obtained by excluding the most significant bit of the code value "1101" included in the second residual region RD1. The decoder 230 may determine −20 representing the code value "110100" as the difference value d.

An example of the bitstream BS of FIG. 5 is described with reference to FIGS. 6A and 6B. However, the present disclosure is not limited thereto, and the number of bits of the bitstream BS and a structure thereof may be changed depending on a compression method, a compression rate, and the like. In addition, the number of bits allocated to each region of the bitstream BS, for example, the header HD and the data block DB, or the number of bits allocated to each region of the data block BD, for example, the residual regions RD0, RD1, RD2, and RD3 and the additional region SUB may also be changed.

Figure 7:
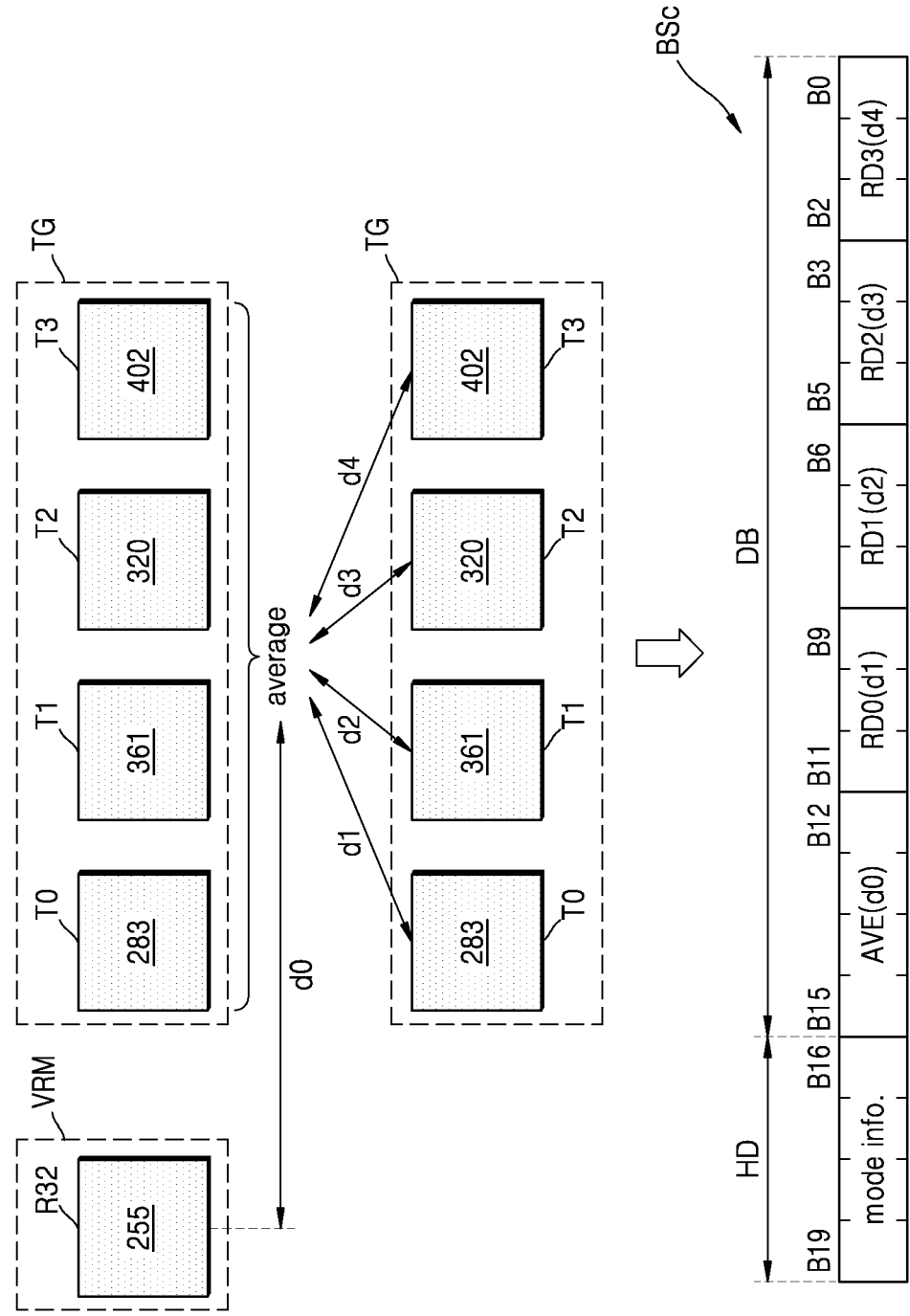
FIG. 7 is a conceptual diagram showing a compression method according to an embodiment of the present disclosure.

FIG. 7 illustrates a compression method according to an embodiment of the present disclosure. The compression method of FIG. 7 may be performed by the offset mode compressor OMC of FIG. 3.

Referring to FIG. 7, the offset mode compressor OMC may compress the target pixels T0, T1, T2, and T3 of the target pixel group TG, based on the compensated reference value of at least one reference pixel included in the VRM. For example, the reference pixel R32 of the VRM may be used for compression of the target pixel group TG.

The offset mode compressor OMC may calculate an average value of pixel values of the target pixels T0, T1, T2, and T3. Thereafter, the offset mode compressor OMC may calculate the difference value d0 between the compensated reference value and the average value of the reference pixel R32. For example, an average value of the target pixels T0, T1, T2, and T3 may be calculated as 342, and a compensated reference value of 255 may be subtracted from 342, and thus, the difference value d0 may be 87. When the pixel value is less than the compensated reference value, the difference value d0 may have a negative value. The offset mode compressor OMC may calculate the difference values d1, d2, d3, and d4 between the average value and pixel values of the target pixels T0, T1, T2, and T3. The offset mode compressor OMC may generate a bitstream BSc for the target pixel group TG based on the difference values d0 and the difference values d1, d2, d3, and d4.

The data block DB may include a plurality of residual regions, for example, the first to fourth residual regions RD0, RD1, RD2, and RD3, and an average region AVE. The difference value d0 may be included in the average region AVE, and the difference values d1, d2, d3, and d4 may be included in the first to fourth residual regions RD0, RD1, RD2, and RD3, respectively.

Figure 8:
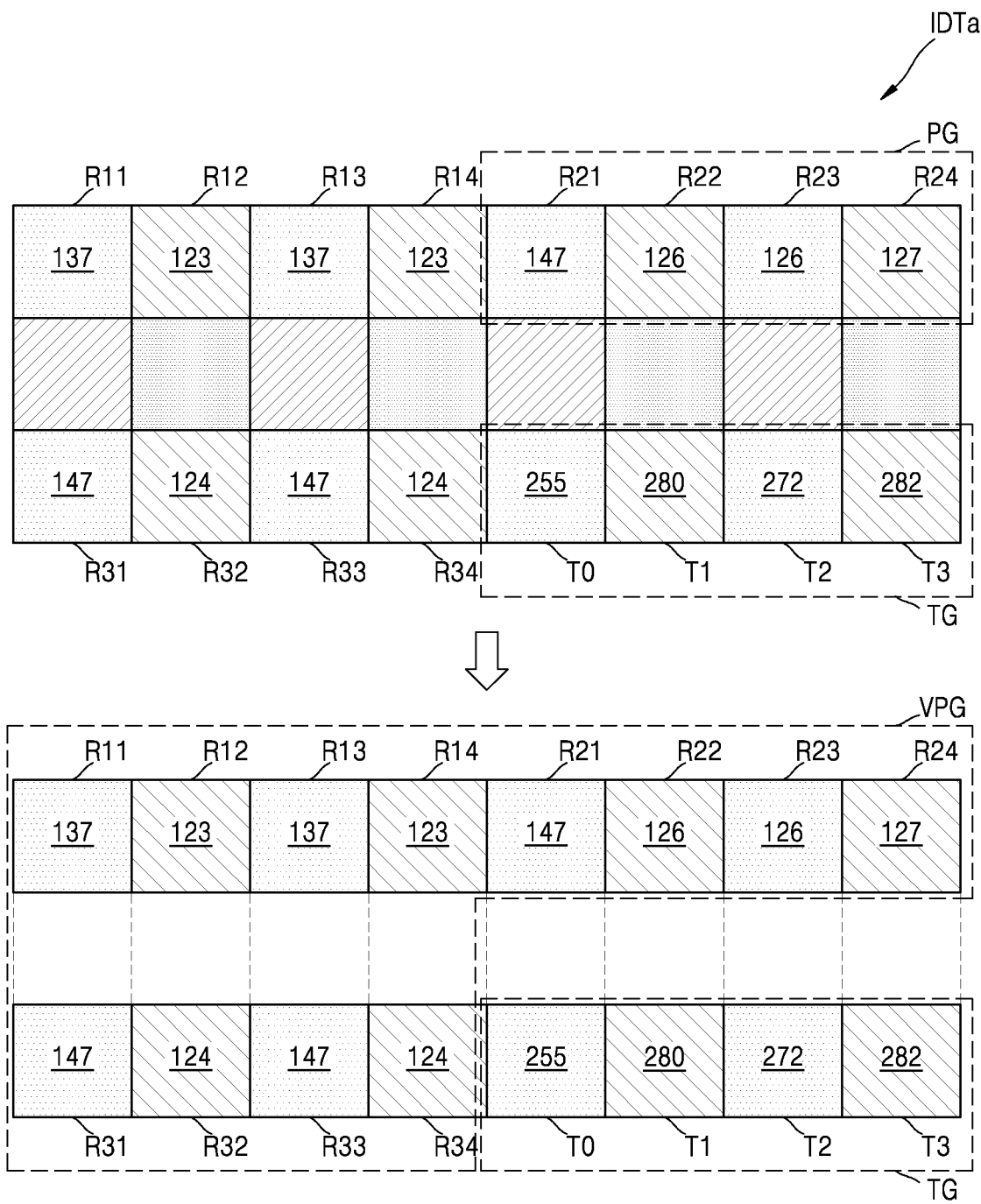
FIG. 8 is a hybrid diagram showing an example of image data and a virtual reference map according to an embodiment of the present disclosure.

FIG. 8 illustrates image data and a VRM according to an embodiment of the present disclosure.

In FIG. 8, image data IDTa may include a Bayer pattern. In an embodiment, the pixel group PG may be set in units of four pixels that are continuously arranged. In an embodiment, the pixel group PG may include two red pixels and two green pixels or may include two blue pixels and two green pixels.

Compression may be performed in units of the pixel groups PG, and the target pixel group TG may be first compressed and may be compressed based on reference pixels (for example, R11, R12, R13, R14, R21, R22, R23, R24, R31, R32, R33, and R34) of the pixel group PG corresponding to the same color among the adjacent pixel groups PG. Pixel values of the target pixel group TG and the reference pixels R11, R12, R13, R14, R21, R22, R23, R24, R31, R32, R33, and R34 may have a significant difference, and the target pixel group TG may be determined to correspond to an isolated region. Accordingly, the target pixel group TG may be compressed by using an offset encoding method.

When the offset value is 128 and the pixel values of the reference pixels are compressed and then decompressed, it is assumed that the pixel values before compression are the same as the pixel values after compression, that is, the reference values. The offset mode compressor OMC in FIG. 3A may generate the VRG by adding an offset value of 128 to each of the reference values of the reference map. The reference values of the reference pixels R11, R12, R13, R14, R21, R22, R23, R24, R31, R32, R33, and R34 may become similar to the pixel values of the target pixels T0, T1, T2, and T3. The offset mode compressor OMC in FIG. 3A may compress the target pixel group TG based on the VRM.

Figure 9:
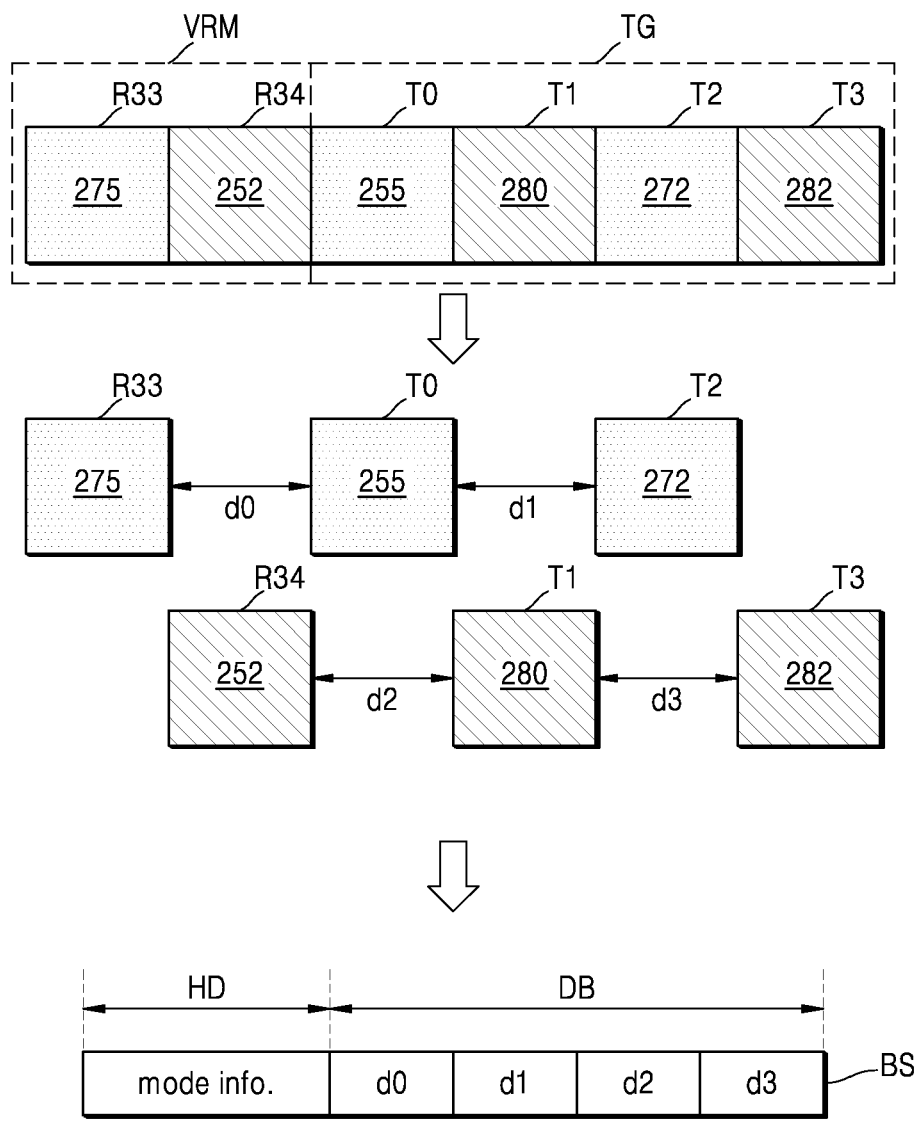
FIG. 9 is a conceptual diagram showing a compression method according to an embodiment of the present disclosure.

FIG. 9 illustrates a compression method according to an embodiment of the present disclosure. The compression method of FIG. 9 may be performed on the image data IDTa of FIG. 8 by using the VRM.

Referring to FIG. 9, the offset mode compressor OMC in FIG. 3A may compress the target pixels T0, T1, T2, and T3 of the target pixel group TG, based on a compensated reference value of at least one reference pixel included in the VRM. For example, the reference pixels R33 and R34 of the VRM may be used for compression of the target pixel group TG. A reference pixel having the same color as the target pixel may be used for compression.

The offset mode compressor OMC may calculate the difference value d0 between the compensated reference value of the reference pixel R33 and the target pixel T0 and also calculate the difference value d1 between the pixel values of the target pixels T0 and T2. In addition, the offset mode compressor OMC may calculate the difference value d2 between the compensated reference value of the reference pixel R34 and the target pixel T1 and calculate the difference value d3 between the pixel values of the target pixels T2 and T3. The offset mode compressor OMC may generate the bitstream BS based on the difference values d0, d1, d2, and d3. The difference values d0, d1, d2, and d3 may be included in the data block DB of the bitstream BS.

Figure 10:
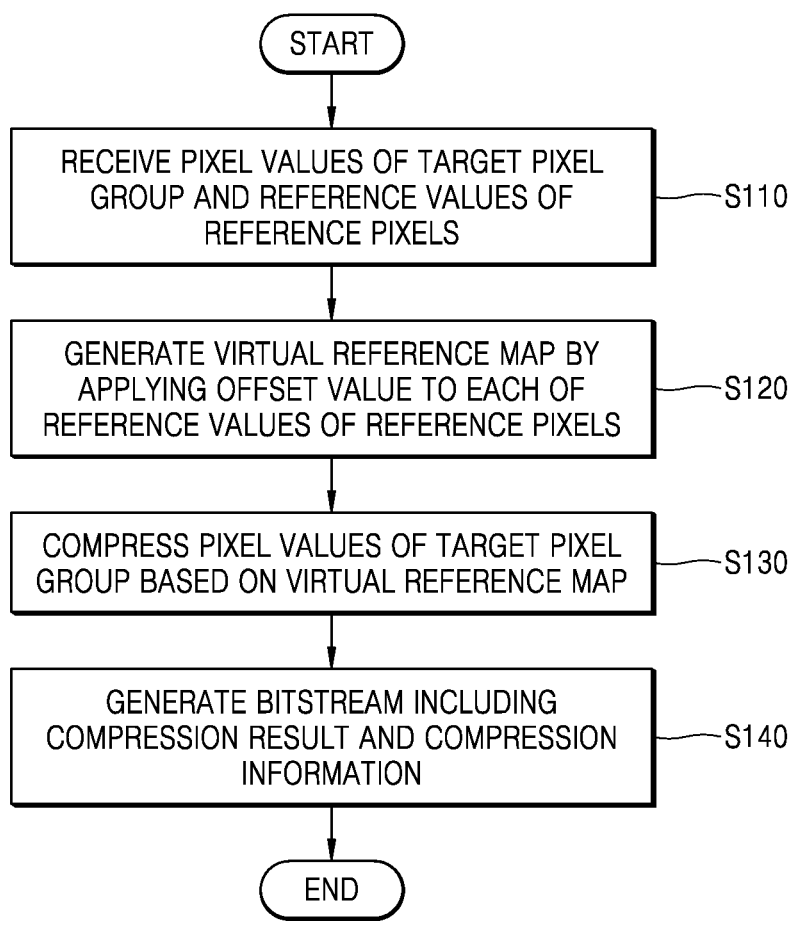
FIG. 10 is a flowchart diagram showing a method of compressing image data according to an embodiment of the present disclosure.

FIG. 10 illustrates a method of compressing image data according to an embodiment of the present disclosure. The compression method of FIG. 10 may include the above-described offset encoding method and may be performed by the offset mode compressors OMC of FIGS. 3A and 3B. The compression method based on the above-described offset encoding method may be applied to the present embodiment.

Referring to FIGS. 3A and 10, the offset mode compressor OMC may receive pixel values of a target pixel group and reference pixel values of reference pixels (S110). In other words, the offset mode compressor OMC may receive the image data IDT including a target pixel group and a reference map including reference values of reference pixels. The target pixel group may include target pixels to be compressed as a pixel group to be compressed, and pixel values corresponding to the target pixels may be received. The reference pixels may be neighboring pixels of the target pixels to be used for compression of the target pixel group. Pixel values of the neighboring pixels may be compressed and then reconstructed to be generated as reference values.

The offset mode compressor OMC may generate a VRM by applying an offset value to each of the reference values of the reference pixels (S120). Compensated reference values may be generated by adding a positive offset value or a negative offset value to each of the reference values. A difference between the compensated reference values and pixel values of target pixels may be less than a difference between reference values and the pixel values of the target pixels. The VRM may include a plurality of the compensated reference values.

In an embodiment, the offset value may be preset, and the offset mode compressor OMC may apply the preset offset value to each of the reference values. In a non-limiting example, when a pixel value or a reference value is represented as data (for example, binary code data) including 8 bits capable of representing 256 values (for example, 0 code to 255 codes), an offset value may be set to the largest pixel value, for example, a value corresponding to half of 255, for example, 127. The offset value may include data (for example, MSB) of 1 bit representing a sign and data of 7 bits representing 127. However, the present disclosure is not limited thereto, and the offset value may be preset in various values and methods.

In an embodiment, the offset mode compressor OMC may include a determination logic for determining the offset value, and the determination logic may determine the offset value based on the reference values. For example, the offset value may be determined according to a grayscale region including the reference values. If a grayscale region including the reference values corresponds to a low grayscale region, a positive candidate offset value corresponding to the grayscale region among positive candidate offset values may be determined as the offset value, and if a grayscale region including the reference values is a high grayscale region, a negative candidate offset value corresponding to the grayscale region among negative candidate offset values may be determined as the offset value. In another example, a candidate offset value corresponding to an actual difference value (in other words, a difference value between a pixel value of the current target pixel and a reference value of the current reference pixel) among a plurality of candidate offset values set based on a difference value between the reference value and pixel values of target pixels may be determined as the offset value. In addition to this, the offset value may be determined depending on various methods.

The offset mode compressor OMC may compress pixel values of a target pixel group, that is, pixel values of target pixels, based on a VRM (S130). For example, the offset mode compressor OMC may compress the target pixel group according to the compression methods described with reference to FIGS. 5, 7 and 9, such as an encoding method. However, the present disclosure is not limited thereto, and various encoding methods may be applied thereto.

The offset mode compressor OMC may generate a bitstream including a compression result and compression information (S140). As described above, the bitstream may include a header and a data block, the header may include compression information, and the data block may include a compression result, for example, a difference value between a reference value of a reference pixel and a pixel value of a target pixel, or a difference value between pixel values of target pixels.

In addition, as described with reference to FIG. 3A, the compression method may further include a step of generating reconstructed pixel values by decompressing a bitstream after the bitstream is generated, and a step of generating reconstructed image data including reference pixels to be used for compression of the next target pixel group to be compressed after the target pixel group, based on the reconstructed pixel values.

Figure 11A:
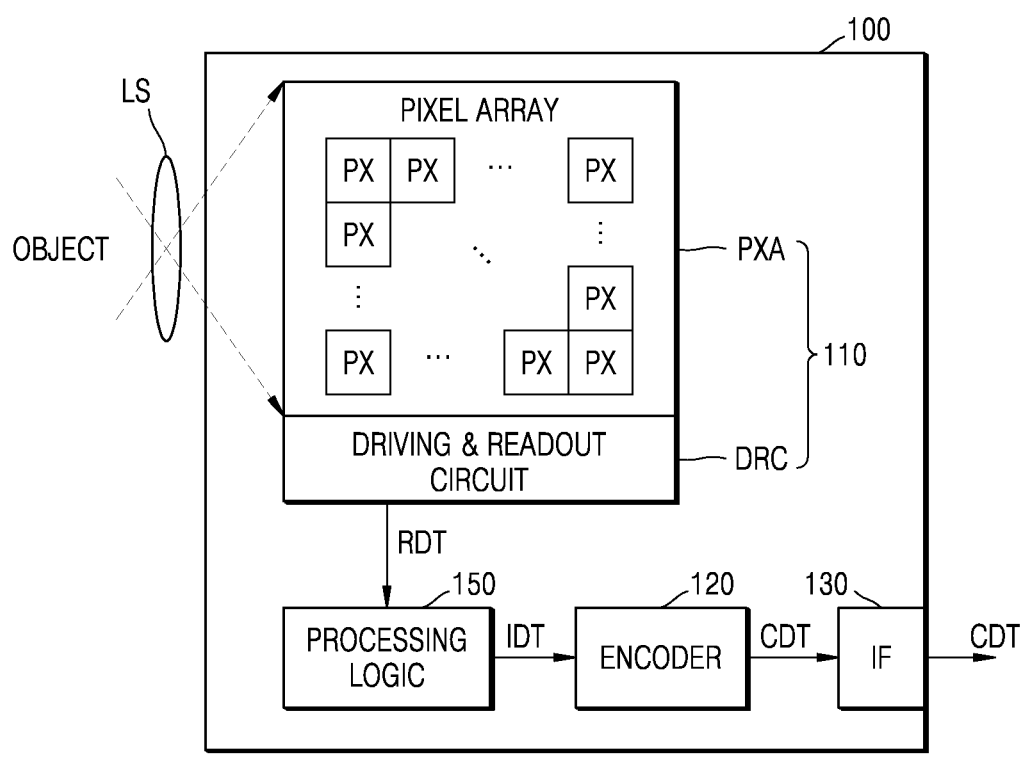
FIG. 11A is a block diagram showing an image sensor module according to an embodiment of the present disclosure.
Figure 11B:
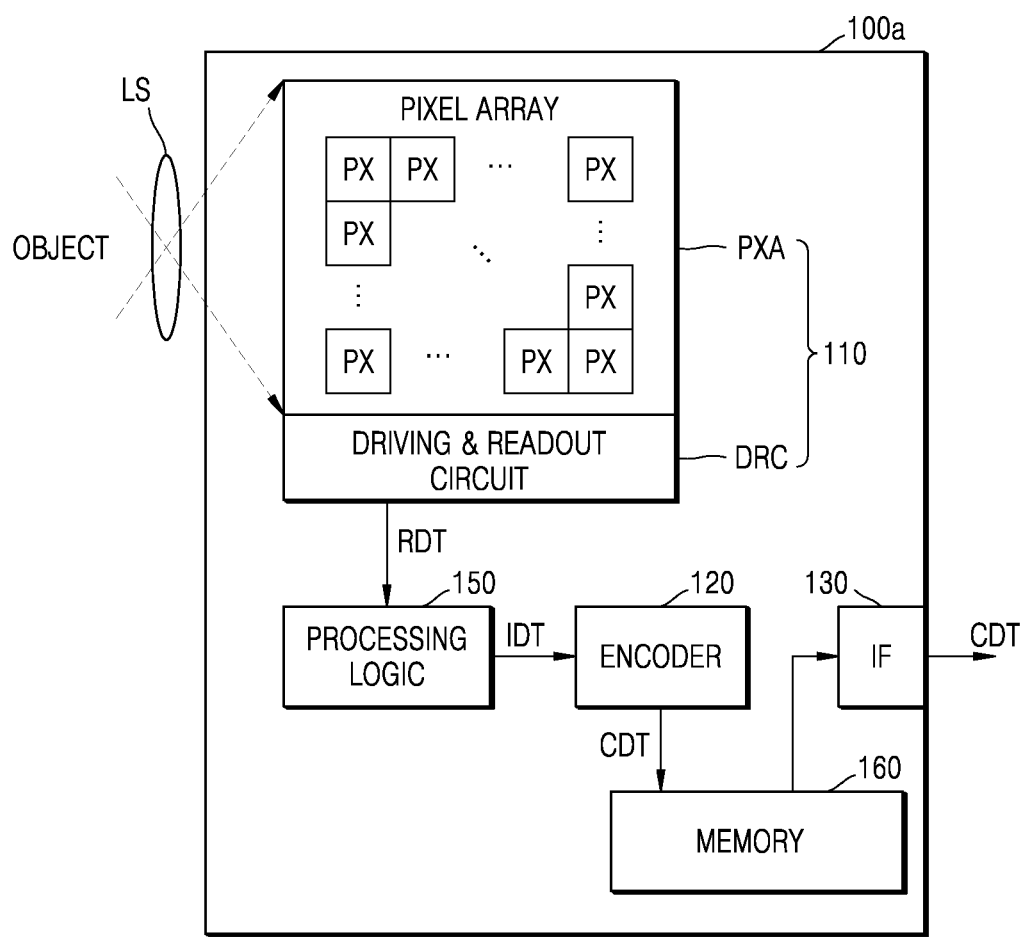
FIG. 11B is a block diagram showing an image sensor module according to an embodiment of the present disclosure.

FIGS. 11A and 11B illustrate image sensor modules according to embodiments of the present disclosure.

Referring to FIG. 11A, an image sensor module 100 may include an image sensor 110, a processing logic 150, an encoder 120, and an interface (IF) 130.

The image sensor 110 may include a pixel array PXA and a driving and readout circuit DRC. As described above, the pixel array PXA may include a plurality of pixels PX arranged in a matrix. The driving and readout circuit DRC may control the pixel array PXA and convert pixel signals received from the pixel array PXA into pixel values. The driving and readout circuit DRC may generate original image data RDT including pixel values corresponding to each of the received pixel signals.

The processing logic 150 may perform preprocessing on the original image data RDT. For example, the preprocessing may include image processing such as bad pixel correction, crosstalk correction, noise removal, binning, size change, and color space conversion.

The encoder 120 may compress image data IDT (or original image data RDT) received from the processing logic 150 to generate compressed data CDT. The encoder 120 may compress the image data IDT in units of pixel groups and may compress a target pixel group to be compressed by using a neighboring pixel group for which the compression is performed. As described above, when the target pixel group corresponds to an isolated region, the encoder 120 may generate a VRM and compress the target pixel group based on this.

The compressed data CDT may be provided to the interface 130, and the interface 130 may transmit the compressed data CDT to the image processing device 200 of FIG. 1.

Referring to FIG. 11B, an image sensor module 100a may further include a memory 160. The memory 160 may include a volatile memory such as DRAM and SRAM, or a nonvolatile memory such as PRAM, ReRAM, MRAM, and flash memory. The compressed data CDT generated by the encoder 120 may be stored in the memory 160. The compressed data CDT may be read from the memory 160 and output through the interface 130.

Figure 12:
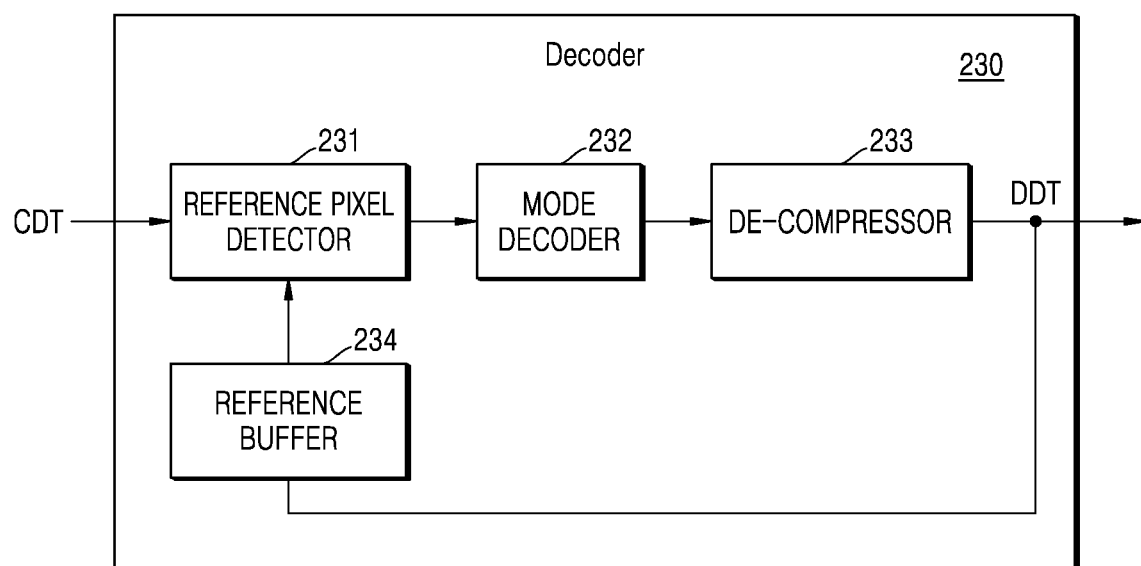
FIG. 12 is a block diagram showing a decoder according to an embodiment of the present disclosure.

FIG. 12 illustrates a decoder according to an embodiment of the present disclosure.

A decoder 230 may decompress the compressed data CDT by performing a series of processes that the encoder 120 in FIG. 1 encodes the image data IDT, in a reverse order and generate, for example, the reconstructed image data.

The decoder 230 may decompress the compressed data CDT by using a decoding method corresponding to the encoding method used by the encoder 120. The decoder 230 may decode the compressed data CDT in units of bitstreams.

The decoder 230 may include a reference pixel detector 231, a mode decoder 232, a de-compressor 233, and a reference buffer 234.

The reference pixel detector 231 may receive the compressed data CDT and may receive a reference map to be used for decompression of a target bitstream to be decompressed among bitstreams included in the image data CDT from the reference buffer 234. The reference map includes neighboring pixels of a pixel group related to a reference target bitstream, that is, reference values of reference pixels.

The reference pixel detector 231 may detect reference values of reference pixels that are positionally adjacent to a target pixel group, that is, reconstructed pixel values of the reference pixels, from the reconstructed image data stored in the reference buffer 225 and may receive the reference values from the reference buffer 225 as a reference map. The reference pixel detector 121 may provide a target bit stream and a reference map of the compressed data CDT to the mode decoder 232 or the de-compressor 233.

The mode decoder 232 may decode a header of a bitstream and determine mode information, a compression rate, loss information, and the like as a decoding result. According to an embodiment of the present disclosure, the mode decoder 232 may check that compression is performed by using an offset encoding method or another encoding method (for example, a DPCM method), with a decoding result of the header.

The de-compressor 233 may reconstruct target pixels from the bitstream based on the determined compression mode, compression rate, loss information, and the like. According to an embodiment of the present disclosure, the decompressor 233 may generate a VRM by applying an offset to a reference map and decode a bitstream based on the VRM. The de-compressor 233 may calculate compensated reference values by applying an offset value used by the encoder 120 to each of the reference values included in the reference map. The VRM may include compensated reference values. The de-compressor 233 may decode the bitstream by using at least one compensated reference value of the VRM or compensated reference values for each pixel group. Pixel groups generated by decoding the bitstream may be output as decompressed data DDT.

The reference buffer 234 may store the decompressed data DDT, that is, reconstructed image data. In an embodiment, the reference buffer 234 may store pixel groups corresponding to a bitstream to be decompressed next among reconstructed image data. In an embodiment, a memory or a buffer (for example, the memory 160) included in the image processing device 200 in FIG. 1 may be used as the reference buffer 234.

Figure 13:
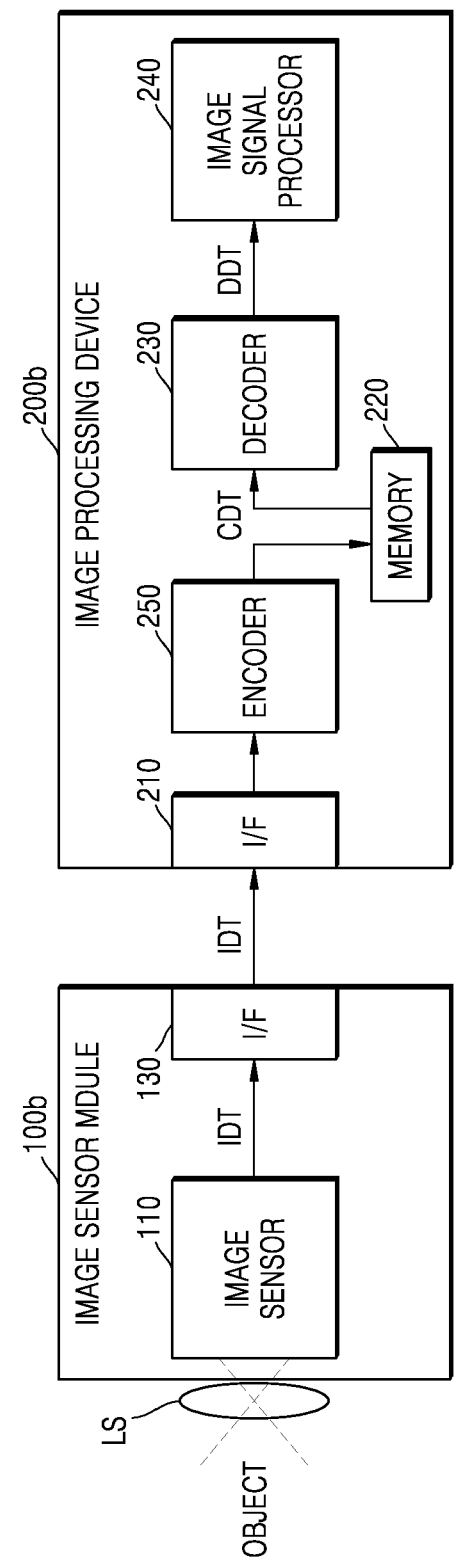
FIG. 13 is a block diagram showing an image processing system according to an embodiment of the present disclosure.

FIG. 13 illustrates an image processing system according to an embodiment of the present disclosure. FIG. 13 shows a modifiable embodiment of the image processing system 10 of FIG. 1.

Referring to FIG. 13, an image processing system 10b may include an image sensor module 100b and an image processing device 200b. The image sensor module 100b may include an image sensor 110 and an interface (I/F) 130. The image sensor module 100b may further include a memory. The image processing device 200b may include an interface (I/F) 210, an encoder 250, a decoder 230, an image signal processor 240, and a memory 220. The encoder 250 of FIG. 13 may correspond to the encoder 120 of FIG. 1.

Comparing the image processing system 10b of FIG. 13 with the image processing system 10 of FIG. 1, the image processing device 200b other than the image sensor module 100b may include the encoder 250, and the image processing device 200b may compress image data IDT. The remaining configurations may be substantially the same as each other. Among configurations of the image processing system 10b, descriptions on the configurations overlapping the configurations of the image processing system 10 of FIG. 1 are omitted.

Referring to FIG. 13, the image sensor 110b may generate the image data IDT (original image data or preprocessed image data). The image data IDT may be transmitted to the image processing device 200b through the interface 130. The image processing device 200b may receive the image data IDT from the image sensor module 100b, compress the image data IDT, and store the compressed data CDT in the memory 260. Thereafter, the decoder 230 may read the compressed data CDT stored in the memory 260 and decompress the compressed data CDT. The decoder 230 may provide the decompressed data CDT, for example, reconstructed image data, to the image signal processor 240.

As described above, compression and decompression may be performed for each pixel group, and a pixel group corresponding to an isolated region of the image data CDT may be compressed or decompressed based on a VRM.

FIG. 14 illustrates compression information according to an embodiment of the present disclosure. FIG. 14 shows an example of a compression mode or compression method according to an embodiment suitable for a proposed mobile industry processor interface (MIPI) standard.

Referring to FIG. 14, the image data IDT of a tetra pattern in FIG. 2 may be compressed according to various compression modes. In addition, the present disclosure is not limited thereto, and image data in which a red pixel group, a blue pixel group, a first green pixel group, and a second green pixel group, each including pixels arranged in an n×n matrix, are repeatedly arranged may also be compressed according to various compression modes.

The compression modes include an average-based directional differential (AD) mode, an extended multi-pixel-based differential (eMPD) mode, an extended horizontal or vertical direction-based Differential (eHVD) mode, an extended horizontal or vertical average-based differential (eHVA) mode, an oblique direction-based differential (OD) mode, an extended outlier compensation (eOUT) mode, an OUT mode, and a fixed quantization and no-reference (FNR) mode. Names of the above-described compression modes represent an example, but the present disclosure is not limited to the above-described example.

In the AD mode, encoding may be performed on a target pixel group by using a DPCM method. For example, a bitstream (for example, BSc of FIG. 7) may be generated based on a difference value between an average value of pixel values of a target pixel group and a reference value of a reference pixel, and a difference value between each of the pixel values and the average value.

The AD mode may be divided into MODE0, MODE1, MODE2, and MODE3 according to a detailed execution algorithm. Because 4 bits may be allocated to a header indicating the compression method, 16 compression modes may each represent header information as different bits. For example, MODE0 may be represented by bits of 0000, MODE1 by bits of 0001, MODE2 by bits of 0010, and MODE3 by bits of 0011.

In the OD mode, the image data IDT having a diagonal structure may be compressed. The OD mode may be divided into MODE4 (bits of 0100) and MODE5 (bits of 0101) according to the detailed execution algorithm.

Similarly, the eMPD mode may include MODE8 (bits of 1000), MODE9 (bits of 1001), MODE10 (bits of 1010), and MODE11 (bits of 1011), the eHVD mode may include MODE12 (bits of 1100) and MODE 13 (bits of 1101), the eHVA mode may include MODE14 (bits of 1110), the eOUT mode may include MODE15 (bits of 1111), and the OUT mode may include MODE7 (bits of 0111). The FNR mode may include MODE6 (bits of 0110). In an embodiment, MODE7 (bits of 0111) may be included in the eOUT mode according to a value stored in the register.

According to an embodiment of the present disclosure, the offset encoding method may correspond to the eOUT mode, and the offset mode compressor OMC in FIG. 3A may generate a bitstream including a header indicating the eOUT mode.

In an embodiment, the mode selector 123 in FIGS. 3A and 3B may sequentially evaluate the AD mode, the eMPD mode, the eHVD mode, the eHVA mode, the OD mode, the eOUT mode, and the FNR mode, and may select the optimal mode according to compression evaluation indexes such as a compression rate and loss information. However, the technical idea of the present disclosure is not limited to the presented mode evaluation order.

Figure 15A:
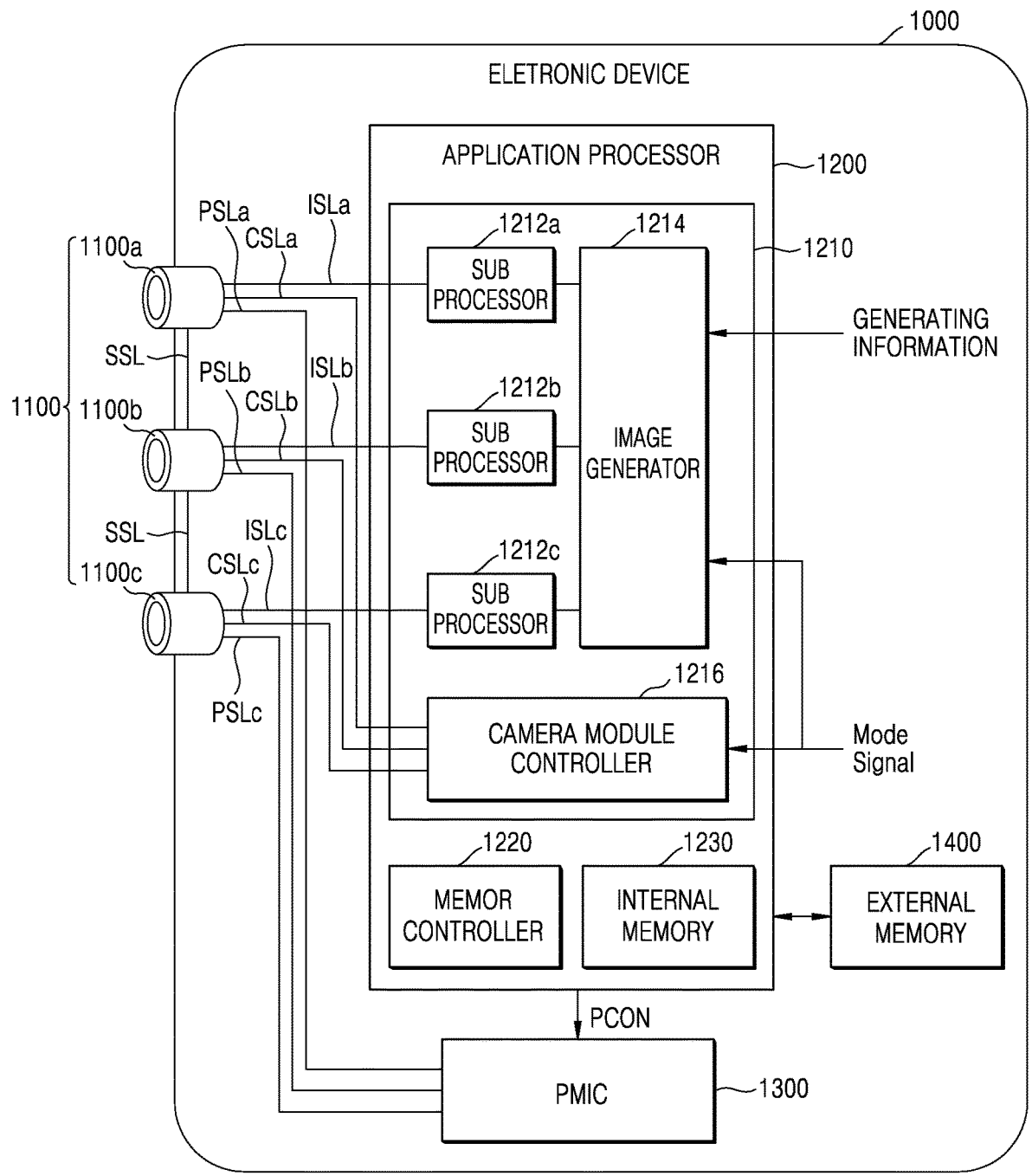
FIG. 15A is a block diagram of an electronic device including a multi-camera module.
Figure 15B:
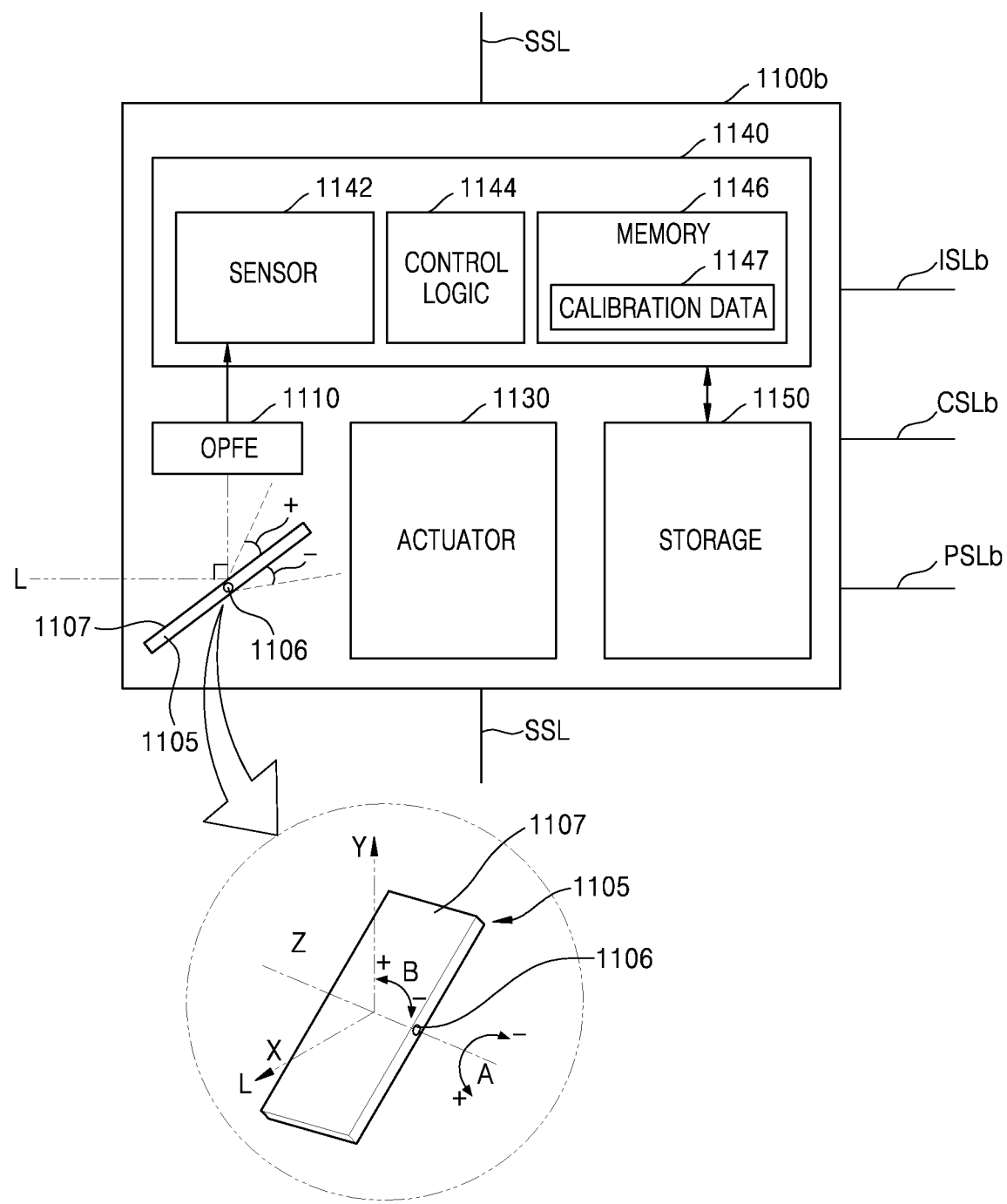
FIG. 15B is a hybrid block diagram of the camera module of FIG. 15A.

FIG. 15A illustrates an electronic device including a multi-camera module, and FIG. 15B is a detailed block diagram of the camera module of FIG. 15A.

Referring to FIG. 15A, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although FIG. 15A shows an embodiment in which three camera modules 1100a, 1100b, and 1100c are arranged, an embodiment is not limited thereto. In some embodiments, for example, the camera module group 1100 may include two camera modules, or may include k (where k is a natural number greater than or equal to 4) camera modules.

Hereinafter, a detailed configuration of the camera module 1100b will be described in more detail with reference to FIG. 15B, and the following description may be equally applied to the other camera modules 1100a and 1100b according to embodiments.

Referring to FIG. 15B, the camera module 1100b may include a prism 1105, an optical path folding element (hereinafter, referred to as "OPFE") 1110, an actuator 1130, an image sensing device 1140, and a storage 1150.

The prism 1105 may include a reflective surface 1107 of a light reflecting material and change a path of light L incident from the outside.

In some embodiments, the prism 1105 may change the path of the light L incident in a first direction X to a second direction Y perpendicular to the first direction X. In addition, the prism 1105 may rotate on a central axis 1106 of the reflective surface 1107 of a light reflecting material in an A direction or a B direction, thereby changing the path of the light L incident in the first direction X to the second direction Y perpendicular thereto. In this case, the OPFE 1110 may also move in a third direction Z perpendicular to the first direction X and the second direction Y.

In some embodiments, the greatest rotation angle of the prism 1105 in the A direction is less than 15 degrees in a +A direction and may be greater than 15 degrees in a −A direction, as shown in FIG. 15B, but an embodiments are not limited thereto.

In some embodiments, the prism 1105 may move in a range of approximately 20 degrees or may move between 10 degrees and 20 degrees or between 15 degrees and 20 degrees in a +B or −B direction, and angles of movement may be the same as each other in the +B or −B direction or may be within a range of 1 degree.

In some embodiments, the reflective surface 1106 of the light reflective material of the prism 1105 may move in the third direction (for example, the Z direction) parallel to an extension direction of the central axis 1106.

In some embodiments, the camera module 1100b may include two or more prisms, thereby variously changing the path of the light L incident in the first direction X to a second direction Y perpendicular to the first direction X, to the first direction X or the third direction Z, and then to the second direction Y again.

The OPFE 1110 may include, for example, an optical lens including m (m is a natural number) groups. The m lenses may move in the second direction Y to change an optical zoom ratio of the camera module 1100b. For example, when a basic optical zoom ratio of the camera module 1100b is referred to as Z, and when m optical lenses included in the OPFE 1110 are moved, the optical zoom ratio of the camera module 1100b may be changed to 3Z, 5Z, or more.

The actuator 1130 may move the OPFE 1110 or an optical lens to a specific position. For example, the actuator 1130 may adjust a position of the optical lens for accurate sensing so that an image sensor 1142 is located at a focal length of the optical lens.

The image sensing device 1140 may include an image sensor 1142, a control logic 1144, and a memory 1146. The image sensor module 100 of FIG. 1 or the image sensor module 100b of FIG. 13 may be applied as the image sensing device 1140.

The image sensor 1142 may sense an image of a sensing target by using the light L provided through the optical lens. The control logic 1144 may control operations of the camera module 1100b and process the sensed image. For example, the control logic 1144 may control the operations of the camera module 1100b according to a control signal provided through a control signal line CSLb, and may extract image data (for example, face, arms, legs, and the like of in an image) corresponding to a specific image in the sensed image or perform image processing such as noise removal.

In an embodiment, the control logic 1144 may include the encoder 120 in FIG. 1 and may encode an image subjected to image processing. As described above, the encoder 120 may compress an image in units of pixel groups and may compress a pixel group in an isolated region according to an offset encoding method.

The memory 1146 may store information, such as calibration data 1147 for the operation of the camera module 1100b. The calibration data 1147 may be information for the camera module 1100b to generate image data by using the light L provided from the outside and may include, for example, information on a degree of rotation, information on a focal length, information on an optical axis, and the like. When the camera module 1100b includes a multi-state camera whose focal length is changed according to a position of the optical lens, the calibration data 1147 may include information on focal length values for each position (or state) of the optical lens and on auto focusing.

In some embodiments, compressed data may be stored in the memory 1146. In addition, the memory 1146 may be used as the reference buffer 125 of the encoder 120.

The storage 1150 may store image data sensed by the image sensor 1142. The storage 1150 may be arranged outside the image sensing device 1140 and may be implemented in a stacked form with a sensor chip constituting the image sensing device 1140. In some embodiments, the image sensor 1142 may include a first chip, and the control logic 1144, the storage 1150, and the memory 1146 may include a second chip so that the two chips may be stacked.

In some embodiments, the storage 1150 may include an electrically erasable programmable read-only memory (EEPROM), but an embodiments are not limited thereto. In some embodiments, the image sensor 1142 may include a pixel array, and the control logic 1144 may include an analog to digital converter and an image signal processor for processing the sensed image.

Referring to FIGS. 15A and 15B, in some embodiments, each of the plurality of camera modules 1100a, 1100b, and 1100c may include an actuator 1130. Accordingly, the plurality of camera modules 1100a, 1100b, and 1100c may include the calibration data 1147 which are the same as each other or different from each other according to an operation of the actuator 1130 included therein.

In some embodiments, one camera module (for example, 1100b) among the plurality of camera modules 1100a, 1100*b*, and 1100*c* may be a folded lens-type camera module including the prism 1105 and OPFE 1110 described above, and the other camera modules (for example, 1100*a* and 1100*c*) may be vertical-type camera modules that do not include the prism 1105 and the OPFE 1110, but are not limited thereto.

In some embodiments, one camera module (for example, 1100*c*) among the plurality of camera modules 1100*a*, 1100*b*, and 1100*c* may be a depth camera of a vertical shape for extracting depth information by using, for example, infrared ray (IR). In this case, the application processor 1200 may merge image data provided from the depth camera with image data provided from another camera module (for example, 1100*a* or 1100*b*) and provide a three-dimensional (3D) depth image.

In some embodiments, at least two camera modules (for example, 1100*a* and 1100*b*) among the plurality of camera modules 1100*a*, 1100*b*, and 1100*c* may have different angles of field of view. In this case, for example, optical lenses of at least two camera modules (for example, 1100*a* and 1100*b*) among the plurality of camera modules 1100*a*, 1100*b*, and 1100*c* may be different from each other, but are not limited thereto.

In addition, in some embodiments, angles of field of view of each of the plurality of camera modules 1100*a*, 1100*b*, and 1100*c* may be different from each other. For example, the camera module 1100*a* may be an ultrawide camera, the camera module 1100*b* may be a wide camera, and the camera module 1100*c* may be a tele camera but are not limited thereto. In this case, the optical lenses included in each of the plurality of camera modules 1100*a*, 1100*b*, and 1100*c* may also be different from each other, but the present disclosure is not limited thereto.

In some embodiments, the plurality of camera modules 1100*a*, 1100*b*, and 1100*c* may be physically separated from each other and arranged. That is, a sensing region of one image sensor 1142 is not divided by the plurality of camera modules 1100*a*, 1100*b*, and 1100*c*, and an independent image sensor 1142 may be arranged inside each of the plurality of camera modules 1100*a*, 1100*b*, and 1100*c*.

Referring back to FIG. 15A, the application processor 1200 may include an image processing device 1210, a memory controller 1220, and an internal memory 1230. The application processor 1200 may be configured as, for example, a semiconductor chip separated from the plurality of camera modules 1100*a*, 1100*b*, and 1100*c*.

The image processing device 1210 may include a plurality of sub-image processors 1212*a*, 1212*b*, and 1212*c*, an image generator 1214, and a camera module controller 1216.

The image processing device 1210 may include the plurality of sub-image processors 1212*a*, 1212*b*, and 1212*c* corresponding to the plurality of camera modules 1100*a*, 1100*b*, and 1100*c*, respectively.

Image data generated by the camera module 1100*a* may be provided to the sub-image processor 1212*a* through an image signal line ISLa, image data generated by the camera module 1100*b* may be provided to the sub-image processor 1212*b* through an image signal line ISLb, and image data generated by the camera module 1100*c* may be provided to the sub-image processor 1212*c* through an image signal line ISLc. Such image data transmission may be performed by using, for example, a camera serial interface (CSI) based on a mobile industry processor interface (MIPI) but is not limited thereto.

In an embodiment, at least one of the plurality of sub-image processors 1212*a*, 1212*b*, and 1212*c* may include the decoder 230 in FIG. 1. When the camera modules 1100*a*, 1100*b*, and 1100*c* corresponding to the plurality of sub-image processors 1212*a*, 1212*b*, and 1212*c* each include the encoder 120 in FIG. 1, the plurality of sub-image processors 1212*a*, 1212*b*, and 1212*c* may include the decoder 230 to decompress the compressed image data.

In some embodiments, the image processing device 200*b* of FIG. 13 may include at least one of the plurality of sub-image processors 1212*a*, 1212*b*, and 1212*c*, and at least one of the plurality of sub-image processors 1212*a*, 1212*b*, and 1212*c* may include the encoder 250 in FIG. 13 and the decoder 230 in FIG. 13.

In some embodiments, one sub-image processor may be arranged to correspond to a plurality of camera modules. For example, the sub-image processor 1212*a* and the sub-image processor 1212*c* may be integrated into one sub-image processor without being separated from each other as shown in FIG. 15A, and image data provided from the camera modules 1100*a* and 1100*c* may be selected by a selection element (for example, a multiplexer) or the like and then provided to the integrated sub-image processor. In this case, the sub-image processor 1212*b* may receive image data from the camera module 1100*b* without being integrated thereinto.

In addition, in some embodiments, image data generated by the camera module 1100*a* may be provided to the sub-image processor 1212*a* through the image signal line ISLa, image data generated by the camera module 1100*b* may be provided to the sub-image processor 1212*b* through the image signal line ISLb, and image data generated by the camera module 1100*c* may be provided to the sub-image processor 1212*c* through the image signal line ISLc. In addition, image data processed by the sub-image processor 1212*b* may be directly provided to the image generator 1214, and image data processed by the sub-image processors 1212*a* and 1212*c* may be selected by selection elements (for example, multiplexers) or the like and then provided to the image generator 1214.

Each of the sub-image processors 1212*a*, 1212*b*, and 1212*c* may perform image processing such as bad pixel correction, 3A adjustments of auto-focus correction, auto-white balance, and auto-exposure, noise reduction, sharpening, gamma control, and re-mosaic for the image data provided from the camera modules 1100*a*, 1100*b*, and 1100*c*.

In some embodiments, re-mosaic signal processing may be performed for each of the camera modules 1100*a*, 1100*b*, and 1100*c*, and then, results of the re-mosaic signal processing may be provided to the sub-image processors 1212*a*, 1212*b*, and 1212*c*.

The image data processed by each of the sub-image processors 1212*a*, 1212*b*, and 1212*c* may be provided to the image generator 1214. The image generator 1214 may generate an output image by using the image data provided from each of the sub-image processors 1212*a*, 1212*b*, and 1212*c* according to image generation information or a mode signal.

The image generator 1214 may generate an output image by merging at least some of the image data generated by the image processors 1212*a*, 1212*b*, and 1212*c* according to the image generation information or the mode signal. In addition, the image generator 1214 may generate the output image by selecting any one of the image data generated by the image processors 1212*a*, 1212*b*, and 1212*c* according to the image generation information or the mode signal.

In some embodiments, the image generation information may include a zoom signal or a zoom factor. In addition, in some embodiments, the mode signal may be a signal based on, for example, a mode selected by a user.

When the image generation information is a zoom signal (zoom factor), and when the camera modules 1100a, 1100b, and 1100c have different fields of view (angles of field of view), the image generator 1214 may perform different operations depending on types of the zoom signal. For example, when the zoom signal is a first signal, the image generator 1214 may generate an output image by using image data outputted from the sub-image processors 1212a and 1212b among image data outputted from the sub-image processors 1212a to 1212c. When the zoom signal is a second signal different from the first signal, the image generator 1214 may generate an output image by using image data outputted from the sub-image processors 1212c and 1212b among image data outputted from the sub-image processors 1212a to 1212c. If the zoom signal is a third signal different from the first signal and the second signal, the image generator 1214 does not perform the image data merging and generate the output image by selecting any one of image data outputted from each of the sub-image processors 1212a, 1212b, and 1212c. However, embodiments are not limited thereto, and a method of processing image data may be modified to meet application criteria.

In some embodiments, the image processing device 1210 may further include a selector (not shown) that selects outputs of the sub-image processors 1212a, 1212b, and 1212c and transmits the selected output to the image generator 1214.

In this case, the selector may perform different operations according to a zoom signal or a zoom factor. For example, when the zoom signal is a fourth signal (for example, a zoom ratio is a first ratio), the selector may select any one of outputs of the sub-image processors 1212a, 1212b, and 1212c and transmit the selected output to the image generator 1214.

In addition, when the zoom signal is a fifth signal different from the fourth signal (for example, the zoom ratio is a second ratio), the selector may sequentially transmit p (p is a natural number greater than or equal to 2) outputs among the outputs of the sub-image processors 1212a, 1212b, and 1212c to the image generator 1214. For example, the selector may sequentially transmit the output of the sub-image processor 1212b and the output of the sub-image processor 1212c to the image generator 1214. In addition, the selector may sequentially transmit the output of the sub-image processor 1212a and the output of the sub-image processor 1212b to the image generator 1214. The image generator 1214 may generate one output image by merging the p outputs that are sequentially received.

Here, the sub-image processors 1212a, 1212b, and 1212c perform image processing such as re-mosaic, down scaling to a video/preview resolution size, gamma correction, and high dynamic range (HDR) processing, and then the processed image data is transmitted to the image generator 1214. Accordingly, even when the processed image data is provided to the image generator 1214 through the selector and one signal line, an image merging operation of the image generator 1214 may be performed at a high speed.

In some embodiments, the image generator 1214 may receive a plurality of pieces of image data having different exposure times from at least one of the plurality of sub-image processors 1212a, 1212b, and 1212c, and perform the high dynamic range (HDR) processing on the plurality of pieces of image data, thereby generating merged image data with an increased dynamic range.

The camera module controller 1216 may provide control signals to the camera modules 1100a, 1100b, and 1100c. The control signals generated by the camera module controller 1216 may be provided to the corresponding camera modules 1100a, 1100b, and 1100c through the control signal lines CSLa, CSLb, and CSLc separated from each other.

Any one of the plurality of camera modules 1100a, 1100b, and 1100c may be designated as a master camera (for example, 1100b) according to image generation information including a zoom signal, or a mode signal, and the other camera modules (for example, 1100a and 1100c) may be designated as slave cameras. Such information may be included in the control signals and provided to the corresponding camera modules 1100a, 1100b, and 1100c through the control signal lines CSLa, CSLb, and CSLc separated from each other.

Camera modules operating as a master camera and slave cameras may be changed according to a zoom factor or an operation mode signal. For example, when an angle of field of view of the camera module 1100a is wider than an angle of field of view of the camera module 1100b and a zoom factor thereof represents a low zoom ratio, the camera module 1100a may operate as a master camera, and the camera module 1100b may operate as a slave camera. In contrast to this, when the zoom factor represents a high zoom ratio, the camera module 1100b may operate as a master camera and the camera module 1100a may operate as a slave camera.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. When receiving the sync enable signal, the camera module 1100b may generate a sync signal based on the provided sync enable signal and transmit the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signals provided from the camera module controller 1216 to the plurality of camera modules 1100a, 1100b, and 1100c may include mode information according to a mode signal. The plurality of camera modules 1100a, 1100b, and 1100c may operate in a first operation mode and a second operation mode in relation to a sensing speed, based on the mode information.

The plurality of camera modules 1100a, 1100b, and 1100c may generate image signals at a first speed in a first operation mode (for example, generate the image signals of a first frame rate), and encode the image signals at a second speed higher than the first speed (for example, encode image signals at a second frame rate higher than the first frame rate), and transmit the encoded image signals to the application processor 1200. In this case, the second speed may be lower than or equal to 30 times the first speed.

The application processor 1200 may store the received image signal, that is, the encoded image signal, in the internal memory 1230 included therein or in the external memory 1400 outside the application processor 1200, and then, read the encoded image signal from the internal memory 1230 or the external memory 1400 and decode the encoded image signal, and display image data generated based on the decoded image signal. For example, a corresponding sub-image processor among the plurality of sub-image processors 1212a, 1212b, and 1212c of the image processing device 1210 may perform decoding, and also perform image processing on the decoded image signal.

The plurality of camera modules 1100a, 1100b, and 1100c may each generate an image signal at a third speed lower than the first speed in the second operation mode (for example, an image signal of a third frame rate lower than the first frame rate) and transmit the image signal to the application processor 1200. The image signal provided to the application processor 1200 may be a signal which is not encoded. The application processor 1200 may perform image processing on the received image signal or may store the image signal in the internal memory 1230 or the external memory 1400.

The PMIC 1300 may supply power, for example, a power supply voltage to the plurality of camera modules 1100a, 1100b, and 1100c. For example, the PMIC 1300 may supply first power to the camera module 1100a through a power signal line PSLa, second power to the camera module 1100b through a power signal line PSLb, and third power to the camera module 1100c through a power signal line PSLc, under the control of the application processor 1200.

The PMIC 1300 may generate power corresponding to each of the plurality of camera modules 1100a, 1100b, and 1100c in response to a power control signal PCON from the application processor 1200 and may also adjust a level of the power. The power control signal PCON may include power adjustment signals for each operation mode of the plurality of camera modules 1100a, 1100b, and 1100c. For example, the operation mode may include a low power mode, and in this case, the power control signal PCON may include information on a camera module operating in the low power mode and a level of power to be set. Levels of powers provided to the plurality of camera modules 1100a, 1100b, and 1100c may be the same as each other or different from each other. In addition, the levels of power may be dynamically changed.

Figure 16:
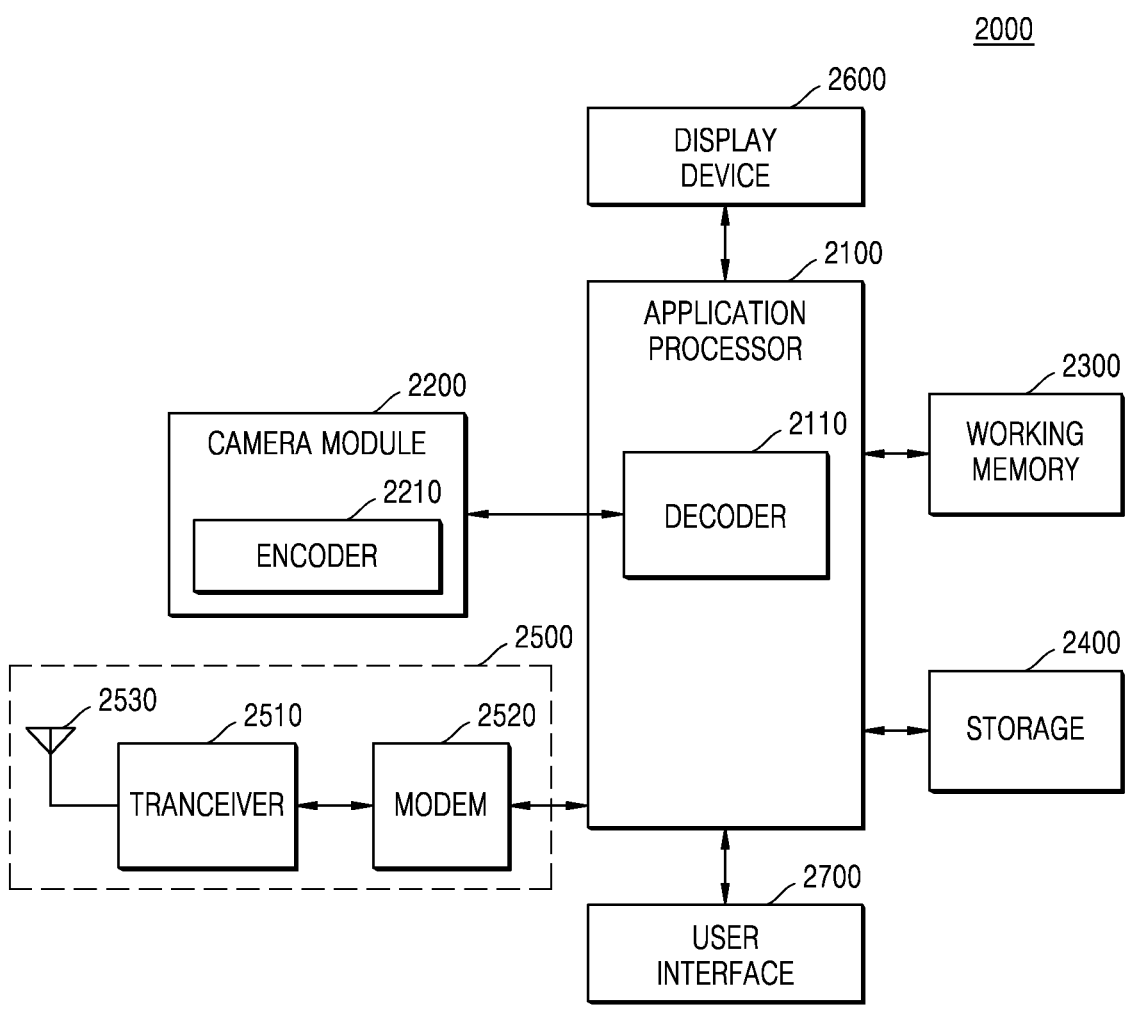
FIG. 16 is a block diagram schematically showing an electronic device according to an embodiment of the present disclosure.

FIG. 16 illustrates an electronic device according to an embodiment of the present disclosure. An electronic device 2000 of FIG. 16 may include a portable terminal.

Referring to FIG. 16, the electronic device 2000 may include an application processor 2100, a camera module 2200, a working memory 2300, a storage 2400, a display device 2600, a user interface 2700, and a wireless transmission/reception unit 2500.

The application processor 2100 may control operations of the electronic device 2000 and may include a system-on-chip (SoC) that drives an application program, an operating system, and the like. The application processor 2100 may provide image data provided from the camera module 2200 to the display device 2600 or may store the image data in the storage 2400.

The image sensor module 100 described with reference to FIGS. 1 to 11B may be applied to the camera module 2200. The image sensor 2200 may include an encoder 2210, and the encoder 2210 may compress image data to generate compressed data and transmit the compressed data to the application processor 2100. As described above, when at least some of image data, for example, at least one pixel group corresponds to an isolated region, the encoder 2210 may compress the pixel group by using an offset encoding method.

The application processor 2100 may include a decoder 2110 that decompresses the compressed data by using a compression method of the encoder 2210, for example, a decoding method corresponding to an encoding method. The decoder 2110 may decompress the compressed data received from the camera module 2200 to generate reconstructed image data, and the application processor 2100 may perform image processing on the reconstructed image data. The application processor 2100 may display the reconstructed image data or the image data subjected to the image processing on the display device 2600 or may store the reconstructed image data or the image data subjected to the image processing in the storage 2400.

The working memory 2300 may include a volatile memory such as DRAM or SRMA, or a non-volatile resistive memory such as ferroelectric random access memory (FeRAM), resistive random access memory (RRAM), or PRAM. The working memory 200 may store programs executed by and/or data processed by the application processor 2100.

The storage 2400 may include a nonvolatile memory device such as NAND flash or resistive memory, and for example, the storage 2400 may include a memory card (multi-media card (MMC), embedded MMC (eMMC), secure digital (SD), or micro SD) or the like. The storage 2400 may store image data received from the camera module 2200 or data processed or generated by the application processor 2100.

The user interface 2700 may include various devices, which may receive a user input, such as a keyboard, a curtain key panel, a touch panel, a fingerprint sensor, and a microphone. The user interface 2700 may receive a user input and provide a signal corresponding to the received user input to the application processor 2100.

The wireless transmission/reception unit 2500 may include a transceiver 2510, a modem 2520, and an antenna 2530.

While the present disclosure has been particularly shown and described with reference to embodiments thereof, it will be understood by those of ordinary skill in the pertinent art that various changes in form and details may be made therein without departing from the spirit and scope of the following claims.

What is claimed is:

1. An image compression method comprising:
    receiving pixel values of a target pixel group to be compressed in image data and reference values of reference pixels to be used for compression of the target pixel group;
    generating a virtual reference map by applying an offset value to each of the reference values;
    compressing the pixel values of the target pixel group based on the virtual reference map; and
    generating a bitstream based on a compression result and compression information based on the virtual reference map,
    wherein the compressing of the pixel values includes calculating a first difference value between a compensated reference value included in the virtual reference map and a first value of at least once of the pixel values, and calculating a second difference value between the first value and another of the pixel values.

2. The image compression method of claim 1, wherein:
    the image data is generated by an image sensor,
    the reference values respectively correspond to reconstructed pixel values of the reference pixels which are compressed prior to the target pixel group, and a difference between a pixel value of a pixel included in the target pixel group and the reference values is greater than or equal to a threshold.

3. The image compression method of claim 1, wherein the generating of the virtual reference map includes determining the offset value based on the reference values.

4. The image compression method of claim 1, wherein the first values is a pixel value of a first pixel of a plurality of pixels included in the target pixel group.

5. The image compression method of claim 4, wherein the bitstream includes data indicating the first difference value and the second difference value, and mode information indicating a compression method.

6. The image compression method of claim 5, wherein a number of bits allocated to a region including the first difference value is greater than a number of bits allocated to a region including the second difference values.

7. The image compression method of claim 5, wherein the bitstream further includes additional information indicating a bit shift amount of the data or the offset value.

8. The image compression method of claim 1, wherein the first value is an average value of the pixel values.

9. The image compression method of claim 1, further comprising:
generating reconstructed pixel values by decompressing the bitstream after the bitstream is generated; and
generating a reconstructed image including reference pixels to be used for compression of a next target pixel group to be compressed after the target pixel group, based on the reconstructed pixel values.

10. The image compression method of claim 1, wherein the target pixel group includes four pixels that correspond to the same color and arranged in two rows and two columns.

11. An image sensor module comprising:
an image sensor configured to generate image data including a plurality of pixels;
an encoder configured to generate compressed data including a plurality of bitstreams by sequentially compressing the image data generated by the image sensor in units of pixel groups and configured to compress a target pixel group to be compressed according to at least one encoding method among a plurality of encoding methods; and
an interface configured to output the compressed data to an external image processing device,
wherein the encoder generates a virtual reference map by applying an offset value to each of reference values of reference pixels arranged adjacent to a target pixel group according to a first encoding method among the plurality of encoding methods and compresses the target pixel group based on the virtual reference map,
wherein the encoder compresses the target pixel group according to the first encoding method among the plurality of encoding methods when a difference between a pixel value of a target pixel of the target pixel group and a reference values is greater than or equal to a threshold.

12. The image sensor module of claim 11, wherein the encoder determines the offset value based on the reference values.

13. The image sensor module of claim 11, wherein the encoder adds a preset offset value to each of the reference values.

14. The image sensor module of claim 11, wherein the encoder encodes the target pixel group by using a differential pulse code modulation (DPCM) method based on the virtual reference map.

15. The image sensor module of claim 11, wherein the encoder generates a plurality of pieces of encoded data by compressing the target pixel group according to the plurality of encoding methods and selects encoded data with a lowest error rate from the plurality of pieces of encoded data as compressed data for the target pixel group.

16. The image sensor module of claim 11, wherein the encoder, generates encoded data by compressing the target pixel group by using an encoding method with a higher priority among the plurality of encoding methods, and compresses the target pixel group by using the first encoding method when an error rate of the encoded data is less than or equal to a reference value.

17. An image processing system comprising:
an image sensor configured to generate image data by sensing a received optical signal;
an encoder configured to generate a plurality of bitstreams by sequentially compressing a plurality of pixel groups of the image data; and
a decoder configured to reconstruct the image data by decompressing the plurality of bitstreams,
wherein the encoder generates a virtual reference map by applying an offset value to each of reference values of reference pixels arranged adjacent to a target pixel group to be compressed and compresses the target pixel group based on the virtual reference map,
wherein the encoder compresses the target pixel group on the virtual reference map when a difference between a pixel value of a target pixel of the target pixel group and the reference values is greater than or equal to a threshold.

18. The image processing system of claim 17, wherein the plurality of bitstreams are transmitted from the encoder to the decoder through a camera serial interface based on a mobile industry processor interface (MIPI).

19. The image processing system of claim 17, wherein the encoder compresses the target pixel group by calculating a first difference value between a compensated reference value included in the virtual reference map and a first value of at least one of the pixel values, and calculating a second difference value between the first value and another of the pixel values.

20. The image sensor module of claim 11, wherein the encoder compresses the target pixel group by calculating a first difference value between a compensated reference value included in the virtual reference map and a first value of at least one of the pixel values, and calculating a second difference value between the first value and another of the pixel values.

* * * * *